(12) United States Patent
Utsunomiya et al.

(10) Patent No.: US 7,849,168 B2
(45) Date of Patent: Dec. 7, 2010

(54) NETWORK SWITCHING APPARATUS, SERVER SYSTEM AND SERVER MIGRATION METHOD FOR SERVER SYSTEM

(75) Inventors: Naoki Utsunomiya, Machida (JP); Tomoki Sekiguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/277,582

(22) Filed: Nov. 25, 2008

(65) Prior Publication Data
US 2009/0240790 A1    Sep. 24, 2009

(30) Foreign Application Priority Data
Mar. 24, 2008   (JP)   .............................. 2008-075787

(51) Int. Cl.
G06F 15/177   (2006.01)
(52) U.S. Cl. ...................................... 709/221; 709/220
(58) Field of Classification Search .................. 709/220, 709/221
See application file for complete search history.

(56) References Cited

U.S. PATENT DOCUMENTS

| | | | | |
|---|---|---|---|---|
| 7,039,008 | B1 * | 5/2006 | Howes et al. ................. | 370/220 |
| 7,383,327 | B1 * | 6/2008 | Tormasov et al. ........... | 709/220 |
| 7,467,191 | B1 * | 12/2008 | Wang et al. .................. | 709/221 |
| 2006/0074957 | A1 * | 4/2006 | Yamamoto et al. .......... | 707/101 |
| 2006/0230103 | A1 * | 10/2006 | Takamoto et al. ........... | 709/203 |
| 2007/0245110 | A1 | 10/2007 | Shibayama et al. | |
| 2008/0162800 | A1 * | 7/2008 | Takashige et al. ........... | 711/104 |
| 2008/0205377 | A1 * | 8/2008 | Chao et al. ................... | 370/351 |
| 2009/0150463 | A1 * | 6/2009 | Sekiguchi et al. ........... | 707/204 |
| 2009/0157846 | A1 * | 6/2009 | Shimozono et al. ......... | 709/218 |
| 2009/0157851 | A1 * | 6/2009 | Dake et al. ................... | 709/220 |

FOREIGN PATENT DOCUMENTS

| | | |
|---|---|---|
| JP | 2006-293592 A | 10/2006 |
| JP | 2007-213271 A | 8/2007 |
| JP | 2007-286709 A | 11/2007 |
| JP | 2008-146566 A | 6/2008 |

OTHER PUBLICATIONS

Clark et al. "Live Migration of Virtual Machines," Proceedings of the 2nd ACM/USENIX Symposium on networked Systems Design and Implementation (NSDI) pp. 273-286(May 2005).

* cited by examiner

*Primary Examiner*—Ario Etienne
*Assistant Examiner*—Michael C Lai
(74) *Attorney, Agent, or Firm*—Townsend and Townsend and Crew LLP

(57) ABSTRACT

A network switching apparatus, a server system and a server migration method for the server system are provided which can perform server migration easily. The server system has a physical server, a physical server having a server virtualization mechanism, a network switching apparatus having a plurality of ports and a management server connected to the network switching apparatus for managing a server migration process for using a migration destination virtual server as the physical server of a migration source, wherein the management server has a migration mechanism for transmitting setting information to be designated to the plurality of ports to the network switching apparatus during the server migration process, and the network switching apparatus changes settings of the plurality of ports in accordance with the transmitted setting information on the plurality of ports.

11 Claims, 25 Drawing Sheets

FIG. 2

127 STATUS TABLE

| PORT NUMBER | VALIDITY FLAG | ATTRIBUTE | | | | | |
| --- | --- | --- | --- | --- | --- | --- | --- |
| | | VLAN-ID | FRAME LENGTH | SPEED | AGGRE-GATION | SECURITY | QoS |
| P1 | VALID | 100 | NORMAL | 1G | NONE | NONE | 10 |
| P2 | VALID | 100 | NORMAL | 1G | NONE | NONE | 10 |
| P3 | INVALID | Def | NORMAL | 1G | NONE | NONE | 10 |
| P4 | INVALID | Def | NORMAL | 1G | NONE | NONE | 10 |
| P5 | INVALID | 110 | JUMBO | 1G | NONE | NONE | 10 |
| P6 | VALID | 110 | JUMBO | 1G | NONE | NONE | 10 |
| P7 | VALID | 110 | JUMBO | 1G | NONE | NONE | 10 |
| P10 | FAULT | | | 1G | NONE | NONE | 10 |

FIG. 3

128    SETTING STATUS

| PORT NUMBER | VALIDITY FLAG | ATTRIBUTE ||||||
|---|---|---|---|---|---|---|---|
| | | VLAN-ID | FRAME LENGTH | SPEED | AGGRE-GATION | SECURITY | QoS |
| P1 | INVALID | 100 | NORMAL | 1G | NONE | NONE | 10 |
| P2 | INVALID | 100 | NORMAL | 1G | NONE | NONE | 10 |
| P3 | VALID | 100 | NORMAL | 1G | NONE | NONE | 10 |
| P4 | VALID | 100 | NORMAL | 1G | NONE | NONE | 10 |

FIG. 4

137  SERVER MANAGEMENT TABLE

| SERVER IDENTIFIER | SERVER TYPE | MANAGEMENT IP ADDRESS | PROCESSOR INFORMATION | MEMORY INFORMATION | I/O INFORMATION | | | | CONNECTION DESTINATION INFORMATION | |
|---|---|---|---|---|---|---|---|---|---|---|
| | | | | | VIRTUALIZATION FLAG | I/O IDENTIFIER | PORT IDENTIFIER | PORT ADDRESS | APPARATUS IDENTIFIER | PORT NUMBER |
| SERVER 100 | PHYSICAL | Addr1 | Xeon 3GHz | 4GB | PHYSICAL | NIC0-0 | | RA1 | SW0 | P1 |
| | | | | | PHYSICAL | NIC1-0 | | RA2 | SW0 | P2 |
| SERVER 101 | PHYSICAL | Addr2 | Xeon 3GHz | 4GB | PHYSICAL | NIC0-0 | | RA3 | SW0 | P6 |
| | | | | | PHYSICAL | NIC1-0 | | RA4 | SW0 | P7 |
| SERVER 102 | VIRTUAL | Addr3 | Xeon 3GHz | 2GB | PHYSICAL | NIC0-0 | | RA5 | SW0 | P3 |
| | | | | | PHYSICAL | NIC1-0 | | RA6 | SW0 | P4 |
| SERVER 103 | VIRTUAL | Addr4 | Xeon 3GHz | 2GB | VIRTUAL | VNIC0 | | RA12 | VSW | VP1 |
| | | | | | VIRTUAL | VNIC1 | | RA13 | VSW | VP2 |
| SERVER 107 | PHYSICAL | Addr5 | Xeon 3GHz | 2GB | PHYSICAL | NIC0 | | RA5 | SW0 | P3 |
| | | | | | PHYSICAL | NIC1 | | RA6 | SW0 | P4 |
| | | | | | PHYSICAL | NIC2 | | RA7 | SW0 | P5 |

135  APPARATUS STATUS TABLE

| APPARATUS IDENTIFIER (500) | PORT NUMBER (501) | VALIDITY FLAG (502) | ATTRIBUTE (503) | | | | | |
|---|---|---|---|---|---|---|---|---|
| | | | VLAN-ID | FRAME LENGTH (504) | SPEED (505) | AGGRE-GATION (506) | SECURITY (507) | QoS (508) |
| SW0 | P1 | VALID | 100 | NORMAL | 1G | NONE | NONE | 10 |
| | P2 | VALID | 100 | NORMAL | 1G | NONE | NONE | 10 |
| | P3 | INVALID | Def | NORMAL | 1G | NONE | NONE | 10 |
| | P4 | INVALID | Def | NORMAL | 1G | NONE | NONE | 10 |
| | P5 | INVALID | 110 | JUMBO | 1G | NONE | NONE | 10 |
| | P6 | VALID | 110 | JUMBO | 1G | NONE | NONE | 10 |
| | P7 | VALID | 110 | JUMBO | 1G | NONE | NONE | 10 |

FIG. 6

136 AFTER-MIGRATION APPARATUS STATUS

| APPARATUS IDENTIFIER 600 | PORT NUMBER 601 | VALIDITY FLAG 602 | ATTRIBUTE 603 | | | | | |
|---|---|---|---|---|---|---|---|---|
| | | | VLAN-ID | FRAME LENGTH 604 | SPEED 605 | AGGRE-GATION 606 | SECURITY 607 | QoS 608 |
| SW0 | P1 | INVALID | 100 | NORMAL | 1G | NONE | NONE | 10 |
| | P2 | INVALID | 100 | NORMAL | 1G | NONE | NONE | 10 |
| | P3 | VALID | 100 | NORMAL | 1G | NONE | NONE | 10 |
| | P4 | VALID | 100 | NORMAL | 1G | NONE | NONE | 10 |

FIG. 11

1004 RESERVATION TABLE

| | RESOURCE ID 1101 | RESOURCE TYPE 1102 | MODEL NUMBER 1103 | SPECIFICATION 1104 | SETTING 1105 | SELECTION PRIORITY 1106 | ASSIGNABILITY 1107 |
|---|---|---|---|---|---|---|---|
| 1111 | CPU0 | CPU | XA0001 | MANUFACTURED BY COMPANY A, 3GHz | DEDICATED(HIGH) : HT=Off(HIGH) | 5 | D |
| 1112 | CPU1 | CPU | XA0001 | MANUFACTURED BY COMPANY A, 3GHz | DEDICATED(HIGH) : HT=Off(HIGH) | 5 | D |
| | NIC0 | NIC | XB0002 | MANUFACTURED BY COMPANY B, 1GB | DEDICATED(MIDDLE) →SHARED | 5 | M |
| | NIC1 | NIC | XB0002 | MANUFACTURED BY COMPANY B, 1GB | DEDICATED(MIDDLE) →SHARED | 5 | M |
| | SCSI0 | SCSI | XC0005 | MANUFACTURED BY COMPANY C, SCSI3 | (HIGH) | 5 | E |
| | SCSI1 | SCSI | XC0005 | MANUFACTURED BY COMPANY C, SCSI3 | (HIGH) | 5 | E |
| | VL0 | HDD-1 | * | NTFS | 20GB,NTFS(HIGH) | 5 | E |
| | VL1 | HDD-2 | * | NTFS | 40GB,NTFS(HIGH) | 5 | E |
| 1113 | CPU0 | CPU | XA0001 | MANUFACTURED BY COMPANY A, 3GHz | HT=Off(HIGH)→+SHARED | 3 | E |
| 1114 | CPU0 | CPU | * | MANUFACTURED BY COMPANY A, 2GHz> | HT=Off(HIGH) | 1 | D |
| 1115 | CPU1 | CPU | XA0001 | MANUFACTURED BY COMPANY A, 3GHz | HT=Off(HIGH)→+SHARED | 3 | E |
| 1116 | CPU1 | CPU | * | MANUFACTURED BY COMPANY A, 2GHz> | HT=Off(HIGH) | 1 | D |

E: ASSIGNABLE
D: UNASSIGNABLE
M: ASSIGNABLE WITH MODIFICATION

FIG. 12

1002 RESOURCE MANAGEMENT TABLE

| RESOURCE TYPE | SETTABLE ITEM | RESOURCE ID | VIRTUAL /REAL FLAG | MODEL NUMBER | SPECIFICATION | ASSIGNMENT STATUS | |
|---|---|---|---|---|---|---|---|
| CPU | DEDICATED HT | VCPU0 | VIRTUAL | XA0001 | MANUFACTURED BY COMPANY A, 3GHz | ASSIGNED | DEDICATED, RCPU=CPU0 |
| | | VCPU1 | VIRTUAL | XA0001 | MANUFACTURED BY COMPANY A, 3GHz | ASSIGNED | DEDICATED, RCPU=CPU1 |
| | | VCPU2 | VIRTUAL | XA0001 | MANUFACTURED BY COMPANY A, 3GHz | ASSIGNED | SHARED, RCPU=CPU2 |
| | | VCPU3 | VIRTUAL | XA0001 | MANUFACTURED BY COMPANY A, 3GHz | ASSIGNED | SHARED, RCPU=CPU2 |
| | | VCPU4 | VIRTUAL | XA0001 | MANUFACTURED BY COMPANY A, 3GHz | RESERVED | |
| | | * | VIRTUAL | XA0001 | MANUFACTURED BY COMPANY A, 3GHz | NOT ASSIGNED | NUMBER =14(1) |
| | | CPU0 | PHYSICAL | XA0001 | MANUFACTURED BY COMPANY A, 3GHz | ASSIGNED | DEDICATED, VCPU=VCPU0 |
| | | CPU1 | PHYSICAL | XA0001 | MANUFACTURED BY COMPANY A, 3GHz | ASSIGNED | DEDICATED, VCPU=VCPU1 |
| | | CPU2 | PHYSICAL | XA0001 | MANUFACTURED BY COMPANY A, 3GHz | ASSIGNED | SHARED, VCPU =VCPU2,VCPU3 |
| | | CPU3 | PHYSICAL | XA0001 | MANUFACTURED BY COMPANY A, 3GHz | NOT ASSIGNED | |
| NIC | DEDICATED VLAN | VNIC0 | VIRTUAL | XB0002 | MANUFACTURED BY COMPANY B, 1GB | ASSIGNED | DEDICATED, RNIC=NIC0 |
| | | VNIC1 | VIRTUAL | XB0002 | MANUFACTURED BY COMPANY B, 1GB | ASSIGNED | DEDICATED, RNIC=NIC1 |
| | | VNIC2 | VIRTUAL | XB0002 | MANUFACTURED BY COMPANY B, 1GB | RESERVED | |
| | | VNIC3 | VIRTUAL | XB0002 | MANUFACTURED BY COMPANY B, 1GB | RESERVED | |
| | | * | VIRTUAL | XB0002 | MANUFACTURED BY COMPANY A, 3GHz | NOT ASSIGNED | NUMBER =6(2) |
| | | NIC0 | PHYSICAL | XB0002 | MANUFACTURED BY COMPANY B, 1GB | ASSIGNED | DEDICATED, VNIC=VNIC0 |
| | | NIC1 | PHYSICAL | XB0002 | MANUFACTURED BY COMPANY B, 1GB | ASSIGNED | DEDICATED, VNIC=VNIC1 |
| | | NIC2 | PHYSICAL | XB0002 | MANUFACTURED BY COMPANY B, 1GB | NOT ASSIGNED | |
| SCSI | | * | VIRTUAL | XC0005 | MANUFACTURED BY COMPANY C, SCSI3 | | NUMBER=8 |
| | | SCSI0 | PHYSICAL | XC0005 | MANUFACTURED BY COMPANY C, SCSI3 | NOT ASSIGNED | |
| HDD | NTFS, Linux | * | VIRTUAL | * | NTFS | NOT ASSIGNED | AMOUNT =300G |
| | | * | VIRTUAL | * | Linux | NOT ASSIGNED | AMOUNT =300G |
| | | VOL | PHYSICAL | * | Linux | ASSIGNED | dir=/vm/vhdd |
| MEM | NOT SHARED | VMEMO | VIRTUAL | * | | ASSIGNED | 2GB |
| | | * | VIRTUAL | * | | NOT ASSIGNED | AMOUNT =14GB |
| | | MEM | PHYSICAL | | | | 14GB |
| PT | VLAN,FRAME LENGTH, SPEED, AGGRE- GATION,... | * | VIRTUAL | * | Generic | NOT ASSIGNED | NUMBER=64 |

136 AFTER-MIGRATION APPARATUS STATUS

| 1400 | 1401 | 1402 | ATTRIBUTE | | | | | | 1409 |
|---|---|---|---|---|---|---|---|---|---|
| APPARATUS IDENTIFIER | PORT NUMBER | VALIDITY FLAG | VLAN-ID 1403 | FRAME LENGTH 1404 | SPEED 1405 | AGGRE-GATION 1406 | SECURITY 1407 | QoS 1408 | MAP INFOR-MATION |
| VSW | P1 | VALID | 100 | JUMBO | 1G | NONE | NONE | 10 | |
| | P2 | VALID | 100 | JUMBO | 1G | NONE | NONE | 10 | |
| | P3 | INVALID | T110 | JUMBO | 1G | NONE | NONE | 10 | NIC116 |

| 500 | 501 | 502 | ATTRIBUTE | | | | | 508 |
|---|---|---|---|---|---|---|---|---|
| APPARATUS IDENTIFIER | PORT NUMBER | VALIDITY FLAG | VLAN-ID | FRAME LENGTH 503 | SPEED 504 | AGGRE-GATION 505 | SECURITY 506 507 | QoS |
| SW0 | P1 | VALID | 100 | NORMAL | 1G | NONE | NONE | 10 |
| | P2 | VALID | 100 | NORMAL | 1G | NONE | NONE | 10 |
| | P3 | INVALID | Def | NORMAL | 1G | NONE | NONE | 10 |
| | P4 | INVALID | Def | NORMAL | 1G | NONE | NONE | 10 |
| | P5 | VALID | T110 | JUMBO | 1G | NONE | NONE | 10 |
| | P6 | INVALID | 110 | JUMBO | 1G | NONE | NONE | 10 |
| | P7 | INVALID | 110 | JUMBO | 1G | NONE | NONE | 10 |

(a) CASE OF ALREADY EXISTING VIRTUAL SERVER (b) CASE OF NO ALREADY EXISTING VIRTUAL SERVER (c) CASE OF NO ALREADY EXISTING VIRTUAL SERVER

FIG. 18

122  DESTINATION TABLE

| PORT NUMBER | VALID FLAG | VIRTUAL ADDRESS | PHYSICAL ADDRESS | FIRST REWRITE RULE | SECOND REWRITE RULE | THIRD REWRITE RULE | FOURTH REWRITE RULE |
|---|---|---|---|---|---|---|---|
| P1 | INVALID | RA1 | RA1 | | | | |
| P2 | INVALID | RA2 | RA2 | | | | |
| P6 | VALID | RA1 | RA3 | R1: (INPUT) TRANSMISSION SOURCE →RA1 | R3: (OUTPUT) TRANSMISSION DESTINATION →RA3 | R2: (INPUT) chaddr OF DHCP→RA1 | |
| P7 | VALID | RA2 | RA4 | R4: (INPUT) TRANSMISSION SOURCE →RA2 | R5: (OUTPUT) TRANSMISSION DESTINATION →RA4 | | R6: (OUTPUT) chaddr OF DHCP→RA3 |

REWRITE RULE

| RULE NUMBER | RULE ADOPTION CONDITION | FLAG | REWRITE LOCATION | VALUE |
|---|---|---|---|---|
| R1 | A11 | INPUT | ether. source | RA1 |
| R2 | DHCP | INPUT | DHCP. chaddr | RA1 |
| R3 | A11 | OUTPUT | ether. destination | RA3 |
| R4 | A11 | INPUT | ether. source | RA2 |
| R5 | A11 | OUTPUT | ether. destination | RA4 |
| R6 | DHCP | OUTPUT | DHCP. chaddr | RA3 |
| R7 | A11 | INPUT | ether. source | VA10 |
| R8 | A11 | OUTPUT | ether. destination | RA1 |
| R10 | WOL | OUTPUT+ OPERATION | duplicate | |

FIG. 20

138  BOOT MANAGEMENT TABLE

| PHYSICAL ADDRESS (2001) | BOOT STATUS (2002) | BACKUP LOCATION (2003) | IP ADDRESS (2004) |
|---|---|---|---|
| RA1 | BACKUP | backup_file1 | |
| RA4 | LOCAL ACTIVATION | backup_file2 | |
| | | | |

NETWORK SWITCHING APPARATUS, SERVER SYSTEM AND SERVER MIGRATION METHOD FOR SERVER SYSTEM

The present application claims priority to Japanese Patent Application No. 2008-075787 filed Mar. 24, 2008, the entire disclosure of which is incorporated herein by refernce.

BACKGROUND OF THE INVENTION

The present invention relates to a server system having a network switching apparatus for moving an execution environment from one server to another, a plurality of servers connected to the network switching apparatus and a management server.

It has been desired to reduce TCO including a management cost of an IT system whose size has increased because of an increase in the number of apparatuses such as servers and networks for supporting an enterprise information system and consolidation of enterprise information systems to a data center due to advancement of outsourcing. It is necessary to improve flexibility of an IT system infrastructure in order to satisfy the requirements such as quick establishment of new services, support for load change, and shortening a service downtime during maintenance.

In order to satisfy the above-described requirements, simplification of management by utilizing server virtualization technologies has been paid attention. Server virtualization means virtualizing an execution environment of applications including OSes at a machine instruction level, and can configure a plurality of OSes on a physical server as an independent execution environment. By homogenizing virtual machine architectures to be presented to OSes, it becomes possible to normalize servers and expect a reduction of a management cost of servers more than managing physical servers of a plurality of vendors.

It is also possible to provide a flexible IT infrastructure by utilizing server virtualization technologies. A conventional IT infrastructure realizing some services has high dependency upon physical servers in terms of management. By weakening a couple to the IT infrastructure by utilizing server virtualization technologies, it becomes now easy to migrate one service running on a physical server to another physical server. These technologies are called server migration technologies.

A main server virtualization vender has recently developed live migration technologies for migrating one server to another without apparently stopping services (refer to "Live Migration of Virtual Machines", by Christopher Clark, Keir Fraser, et. al., Symposium on Network Systems Design and Implementation, May, 2005). Support for load change, shortening a service downtime during maintenance and the like utilizing the live migration technologies have also been proposed.

It is necessary for server migration to inherit settings of a plurality of servers providing services, networks and storages. Since a plurality of apparatuses and a plurality of setting changes are associated with setting inheritance, a plurality of settings of a plurality of apparatuses are required to be changed with consistency. Since high reliability is required particularly for services supporting an enterprise information system, it is important to increase fault tolerance during settings and improve migration flexibility to expand migration adoption destinations.

Reference is made also to JP-A-2007-286709.

In order to reliably perform settings of each apparatus regarding server migration, it is generally desired that an issue of a setting operation for each apparatus ends either as a normal termination after completion of requested settings or as an abnormal termination in a state before settings if a fault occurs and requested settings cannot be executed. This nature is called atomicity of setting operation.

However, in migration involving a plurality of apparatuses, the state before settings may not be recovered easily in some cases depending upon the fault state.

Namely, for server migration, even one apparatus requires a plurality of settings for a migration source server and a migration destination server. Particularly for a network switch interconnecting both the servers, a plurality of settings are essential. In this case, it is necessary to issue setting commands for a plurality of setting items, confirm whether execution of each command has succeeded or failed, and to describe a script to be executed when the command execution was failed. There arise therefore the following problems. Statements of a network setting script in a server migration process becomes complicated. Further, since the number of threads which perform settings of the network switch is not necessarily a single, it is necessary to execute exclusive control that while one thread performs plurality of settings, setting for the same item by another thread should be inhibited. The setting process becomes further complicated because of this exclusive control. Because the server migration process flow becomes complicated, management itself becomes also complicated. Further, it becomes difficult to add a new function of the migration script to deal with a new fault and to perform maintenance of the migration script each time the function is added.

Conventional server migration is realized on the assumption that settings for networks and storages are performed in advance, and lacks setting flexibility. There arise therefore the following problems. For example, the configuration and settings cannot be changed depending upon the status of a physical server for hosting a migration destination virtual server. Further, in an environment where a migration destination is dynamically selected by server virtualization technologies, it is not possible to configure a virtual server and perform settings of networks, storages and the like in advance. Particularly in a case where even a migration destination server cannot be configured, it is not possible even to judge resources necessary for settings from the current configuration.

Further, conventional live migration technologies are realized on the assumption that storages are shared by SAN and do not deal with migration in an environment where there are systems and data volumes in a hard disc built-in a server. On the other hand, there is a server migration method utilizing deploy technologies for execution environment distribution. However, the deploy technologies are not technologies suitable for server migration and server identification is performed based on network physical addresses. There arise therefore the following problems. If the deploy technologies are directly applied to server migration, network physical addresses will be changed. Further, since network setting is associated with not only network switches but also settings of a network interface on the server side, there arise some inconveniences if the physical addresses are changed.

SUMMARY OF THE INVENTION

The present invention has been made in view of the above-described problems, and it is an object of the present invention to provide a network switching apparatus, a server system and a server migration method for the server system, capable of readily performing server migration.

In order to achieve the above object, the present invention provides a network switching apparatus for connecting first and second servers, comprising: a plurality of ports connectable to either the first server or the second server; and a collective setting changing unit for changing settings of the plurality of ports in accordance with setting information designated to the plurality of ports, in a server migration process for using a migration destination virtual server to be configured on the second server instead of the first server of a migration source.

In order to achieve the above object, the present invention provides a server system comprising: first and second servers each having a server virtualization mechanism unit capable of configuring a plurality of virtual servers; a network switching apparatus having a plurality of ports connectable to either the first server or the second server, for establishing a connection between the first and second servers; and a management server connected to the network switching apparatus for managing a server migration process for using a migration destination virtual server to be configured on the second server instead of the first server of a migration source, wherein: the management server includes a migration mechanism unit for transmitting setting information to be designated to the plurality of ports during the server migration process; and the network switching apparatus includes a collective setting changing unit for changing settings of the plurality of ports in accordance with the transmitted setting information on the plurality of ports.

In order to achieve the above object, the present invention provides a server migration method for a server system comprising first and second servers each having a server virtualization mechanism unit capable of configuring a plurality of virtual servers, a network switching apparatus having a plurality of ports connectable to either the first server or the second server, for establishing a connection between the first and second servers, and a management server connected to the network switching apparatus for managing a server migration process for using a migration destination virtual server to be configured on the second server instead of the first server of a migration source, the server migration method comprising steps of: transmitting setting information to be designated to the plurality of ports during the server migration process; and changing settings of the plurality of ports in accordance with the transmitted setting information on the plurality of ports.

With these arrangements, in the server migration process, the management server transmits setting information designated to the plurality of ports to the network switching apparatus, and the network switching apparatus changes the settings of the plurality of ports in accordance with the transmitted setting information of the plurality of ports. Therefore, for example, as the management server designates the setting information after server migration to all ports of the network switching apparatus, settings of the network switching apparatus connecting the migration source server and migration destination server can be performed collectively.

According to the present invention, for example, as the management server designates the setting information after server migration to all ports of the network switching apparatus, it becomes possible to collectively perform settings of the network switching apparatus connecting the migration source server and migration destination server. A plurality of settings for migration source and destination servers in a conventional case are not necessary, settings of the network switching apparatus connecting both the servers which essentially require a plurality of settings for server migration, can be completed by a single operation so that server migration can be performed easily.

BRIEF DESCRIPTION OF THE DRAWINGS

FIG. 2 is a diagram illustrating the structure of a status table shown in FIG. 1.

FIG. 3 is a diagram illustrating the structure of a setting status shown in FIG. 1.

FIG. 4 is a diagram illustrating the structure of a server management table shown in FIG. 1.

FIG. 5 is a diagram illustrating the structure of an apparatus status table shown in FIG. 1.

FIG. 6 is a diagram illustrating the structure of an after-migration apparatus status shown in FIG. 1.

FIG. 11 is a diagram illustrating the structure of a reservation table shown in FIG. 10.

FIG. 12 is a diagram illustrating the structure of a resource management table shown in FIG. 10.

FIG. 14 is a diagram illustrating the structure of an after-migration apparatus status shown in FIG. 10.

FIG. 18 is a diagram illustrating the structure of a destination table shown in FIG. 17.

FIG. 19 is a diagram illustrating the structure of a rewrite rule.

FIG. 20 is a diagram showing the structure of a boot management table shown in FIG. 17.

DETAILED DESCRIPTION OF THE EMBODIMENTS

The first embodiment of the present invention will first be described with reference to FIGS. 1 to 9. First, the structure of the first embodiment will be described with reference to FIGS. 1 to 6.

Figure 1:
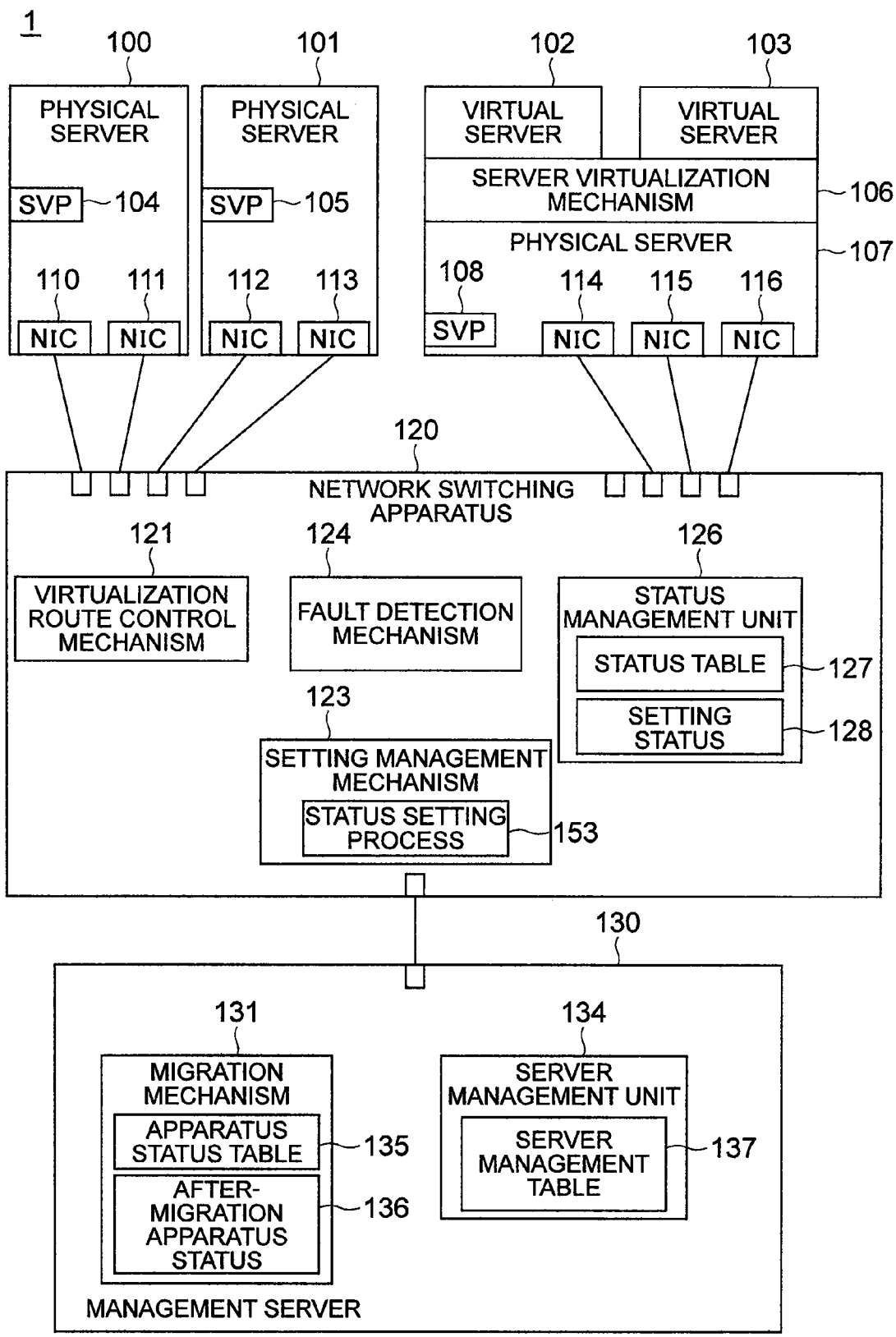
FIG. 1 is a schematic diagram illustrating the structure of a server system according to a first embodiment.

FIG. 1 is a schematic diagram illustrating the outline structure of a server system of the first embodiment. The server system 1 includes physical servers 100, 101 and 107 to be migrated, a management server 130 and a network switching apparatus 120 interconnecting the servers. A network shown in FIG. 1 is a business network used as a path on which traffics flow when services provided by a server are utilized by a client. In addition to the business network, a management network (not shown) exists which monitors and sets up respective apparatuses including servers, networks and storages.

Each of the physical servers 100, 101 and 107 has a plurality of network interface cards (hereinafter called NIC). In FIG. 1, the physical servers 100, 101 and 107 have: NICs 110 and 111; NICs 112; and 113 and NICs 114 to 116, respectively. NICs 110 to 116 of the physical servers 100,101 and 107 are connected to the network switching apparatus 120 to be described later.

The physical servers 100, 101 and 107 have corresponding service processors (hereinafter called SVP) 104, 105 and 106 for server control, respectively. Even if main power sources of the physical servers 100,101 and 107 are in an OFF state, SVPs 104, 105 and 108 continue to function to manage the physical servers 100, 101 and 107, and are generally connected to the management network.

The physical server 107 has a server virtualization mechanism 106, and virtual servers 102 and 103 are configured on the server virtualization mechanism 106. The server virtualization mechanism 106 performs collection of various information and settings for the virtual servers 102 and 103. In order to provide the virtual servers 102 and 103, the server virtualization mechanism 106 virtualizes I/O interfaces, CPUs and the like constituting the servers. The server virtualization mechanism 106 has also a mechanism (hereinafter called direct map mechanism) for directly mapping a physical I/O interface to a virtual server without virtualizing the I/O interface.

The network switching apparatus 120 has: a virtualization route control mechanism 121 necessary for virtualization of a physical address; a fault detection mechanism 124 for dealing with a fault; a status management unit 126: and a setting management mechanism 123 for managing settings of resources such as network ports of the apparatus. The network switching apparatus 120 has further a plurality of ports (not shown), and connected to the physical servers 100, 101 and 107 and the management server 130 to be described later, via the ports. The setting management mechanism 123 has a status setting process 153 for realizing collective status settings for the plurality of ports. The status management unit 126 has a status table 127 for holding statuses of resources such as the ports managed by the network switching apparatus 120, and a setting status 128 for holding setting information necessary for collective settings.

The management server 130 has a migration mechanism 131 and a server management unit 134. The management server 130 performs power source ON/OFF, acquisition of various information or various settings for the physical servers 100, 101 and 107 and virtual servers 102 and 103 via the management network, directing SVPs 104, 105 and 108 on the physical servers 100, 101 and 107. The migration mechanism 131 has an apparatus status table 135 and an after-migration apparatus status 136. The server management unit 134 has a server management table 137.

FIG. 2 is a diagram illustrating the structure of the status table 127 shown in FIG. 1. The status table 127 is used for indicating the statuses of the network switching apparatus 120 and recording the status of each resource such as the port of the network switching apparatus 120. FIG. 2 shows the statuses before server migration. The status table 127 is updated to the latest statuses by the setting management mechanism 123 when the status of the network switching apparatus 120 is changed. The status is managed for each port, having a validity flag 201 representative of port validity and attributes. Each port is identified by a port number 200 recorded as the first item of the status table 127. The validity flag 201 records each status: valid, invalid and fault. "Valid" means valid, indicating that the port is linked up normally. "Invalid" means invalid, indicating that the function was stopped by setting. "Fault" means that a port stop functioning because of a fault and it is impossible to make valid. The fault includes, for example, a frame check error which is an error of a received packet, an invalid VLAN-ID error when an ID of a virtual LAN (VLAN) not permitted is designated, a aggregation error when ports having different attributes are aggregated, and the like. The attribute includes a VLAN-ID 202, a frame length 203, a communication speed 204, a aggregation 205 indicating presence/absence of information on link aggregation setting, a security 206 indicating presence/absence of security setting and a QoS 207. For example, the first record in FIG. 2 records the status of a port having a port number 200 of "P1" and indicates that "a port number P1 is valid, 100 is set as VLAN-ID, a frame length is a normal length, a communication speed is 1 Gb/s, link aggregation is not made, security setting is not made".

FIG. 3 is a diagram illustrating the structure of the setting status shown in FIG. 1. The setting status 128 records the statuses of the network switching apparatus 120 after migration for each port. The setting status 128 is recorded by the management server 130 via the management network at the time of server migration. The status of each port is recorded in items of the setting status 128. Items 301 to 309 following the first item of the port number 300 are the same as those of the status table 127.

FIG. 4 is a diagram illustrating the structure of the server management table shown in FIG. 1. The server management table 137 records information on the structure of each of the physical servers 100, 101 and 107. Each of the physical servers 100, 101 and 107 is identified by a unique identifier. Items characteristic to the structure of each of the physical servers 100,101 and 107 are constituted of: a server type 401 indicating whether the server is a physical server or a virtual server; a management IP address 402; processor information 403; memory information 404; a virtualization flag 405, an I/O identifier 406 and a port address 407 of a connection port of an I/O interface as I/O information; an apparatus identifier 408 and a port number 409 as connection destination information. The I/O information records information on the I/O interface of each of the physical servers 100, 101 and 107 and virtual servers 102 and 103, and have the virtualization flag 405, I/O identifier 406, and port address 407. The I/O identifier 406 is an identifier for identifying an I/O interface, and an I/O type (such as a network interface or a host bus adapter of a Fibre channel), a supply vendor and a model number can be identified from the I/O identifier 406. In the case of the virtual servers 102 and 103, either a virtual interface or a physical interface can be specified as the I/O interface to be connected to the virtual servers 102 and 103 and the specification is recorded in the virtualization flag 405. The connection destination information records information on a network switch to be connected to the I/O interface of each of the physical servers 100, 101 and 107 and virtual servers 102 and 103. The network switch can be identified by the apparatus identifier 408 which can identify an apparatus type (such as a network switch or a Fibre channel switch), a supply vendor and a model number. The port number 409 records a port number of a network switching apparatus to be connected to the I/O interface. For example, the first record shown in FIG. 4 indicates that "the physical server 100 has two NICs whose identifiers are NIC0-0 and NIC1-0, the physical addresses of the ports are RA1 and RA2, and the port numbers of the network switching apparatus 120 connected to the physical server 100 are P1 and P2". As a physical or virtual structure is changed, the server management table 137 is manually updated by a system administrator or automatically updated by acquiring changes in the configuration.

FIG. 5 is a diagram illustrating the structure of the apparatus status table shown in FIG. 1. The apparatus status table 135 is created for each network switch. In this embodiment, since the only network switch is the network switching apparatus 120 (SW0), only the information on the network switching apparatus 120 (SW0) is recorded. Items 501 to 508 following the first item of the apparatus identifier 500 are the same as those of the status table 127 shown in FIG. 2.

FIG. 6 is a diagram illustrating the structure of an after-migration apparatus status shown in FIG. 1. The after-migration apparatus status 136 records the setting status of each resource of each apparatus after server migration. In this embodiment, prior to server migration, a system administrator records the status of only a migration source server in conformity with the management policy of the whole server system, and does not record the status of a migration destination server. For example, as the management policy for server migration from the physical server 100 connected to the ports (P1 and P2) to the virtual server on the physical server 107 connected to the ports (P3 and P4), only the ports (P1 and P2) connected to the migration source physical server 100 are invalidated. Therefore, the flags of the records having the port numbers 601 of "P1" and "P2" are set to "invalid", whereas the records having the port numbers 601 of "P3" and "P4" are set empty. FIG. 6 shows the statuses of the ports (P3 and P4) finally determined by the migration mechanism 131. Namely, the records of the port numbers 601 of "P3" and "P4" inherit the initial settings of the ports (P1 and P2) in the information on the status table 127 shown in FIG. 2. For example, the records having the port numbers 601 of "P3" and "P4" have the validity flag 602 of "valid", a VLAN-ID 603 of "100" as VLAN attribute, a frame length 604 of "normal", a speed 605 of "1 GB/s", a aggregation 606 of "none", a security 607 of "none", and a QoS 608 of "10". As compared to FIG. 3, the validity flag 602 and VLAN attributes are changed, which means that these items are to be changed. Items 600 to 608 of the after-migration apparatus status 136 are the same as those of the apparatus status table 135.

Next, with reference to FIGS. 7 to 16, description will be made on an operation of server migration of migrating an execution environment from a physical server to a virtual server.

Figure 7:
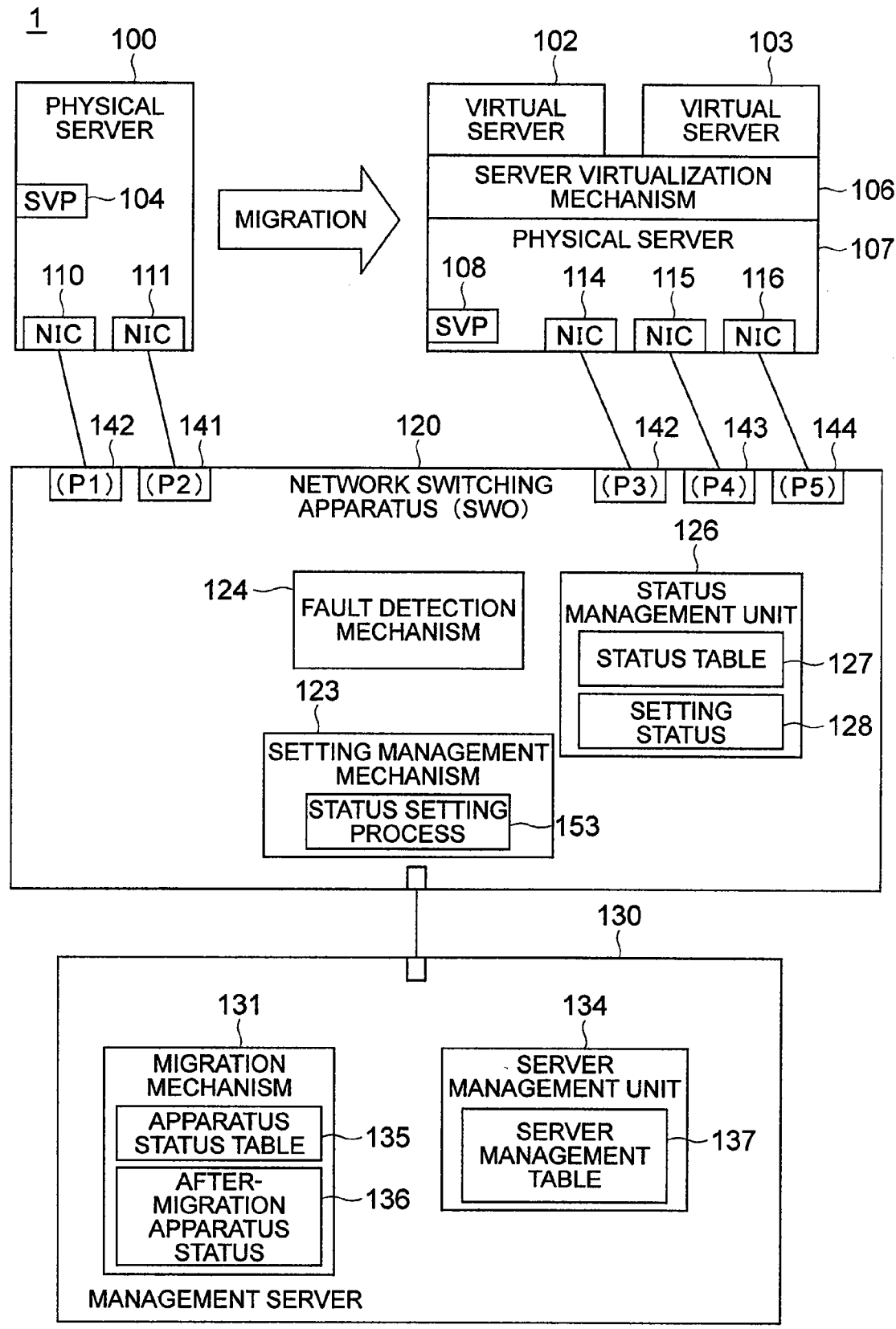
FIG. 7 is a schematic diagram illustrating the structure of the server system of the first embodiment regarding server migration.

FIG. 7 is a schematic diagram illustrating the outline structure of a sever system regarding server migration according to the first embodiment.

In this embodiment, as shown in FIG. 7, an execution environment of the physical server 100 is migrated to the virtual server 102 on the physical server 107. NIC 110 and NIC 111 of the physical server 100 are connected to ports 140 (P1) and 141 (P2) of the network switching apparatus 120, respectively. NICs 114 to 116 of physical server 107 are connected to ports 142 to 144 (P3 to P5) of the network switching apparatus 120, respectively.

A server migration process starts upon instruction by a system administrator from a console connected to the management server 130 or a management server which is connected via the management network. The server migration process is executed while a program of the management server 130 communicates with the network switching apparatus 120, migration source physical server 100, and server virtualization mechanism 106 of the migration destination physical server 107, via the management network. Prior to the server migration process, a system administrator performs settings for the structure of the migration destination virtual server 102 in such a manner that resources of the migration source physical server 100 and migration destination virtual server 102, i.e., the number of CPUs, a mount memory capacity, and a type of an I/O interface, become compatible. In this embodiment, in order to configure the migration destination virtual server 102, the system administrator assigns the migration destination server 102 with virtual resources generated from respective physical resources by the server virtualization mechanism 106 by using a control screen of the server virtualization mechanism 106, via the management network. More specifically, the system administrator confirms, regarding NIC, whether the number of available NICs is more than the number of NICs 110 of the migration source physical server 100, and assigns the physical NICs 114 and 115 (NIC0 and NIC1) by utilizing the direct map function of the server virtualization mechanism 106. Also for other resources such as CPUs and memories, a configuration similar to that of the migration source physical server is used. Next, the system administrator instructs the migration mechanism 131 to start the server migration process, by designating the migration source physical server 100 and migration destination virtual server 102.

Figure 8:
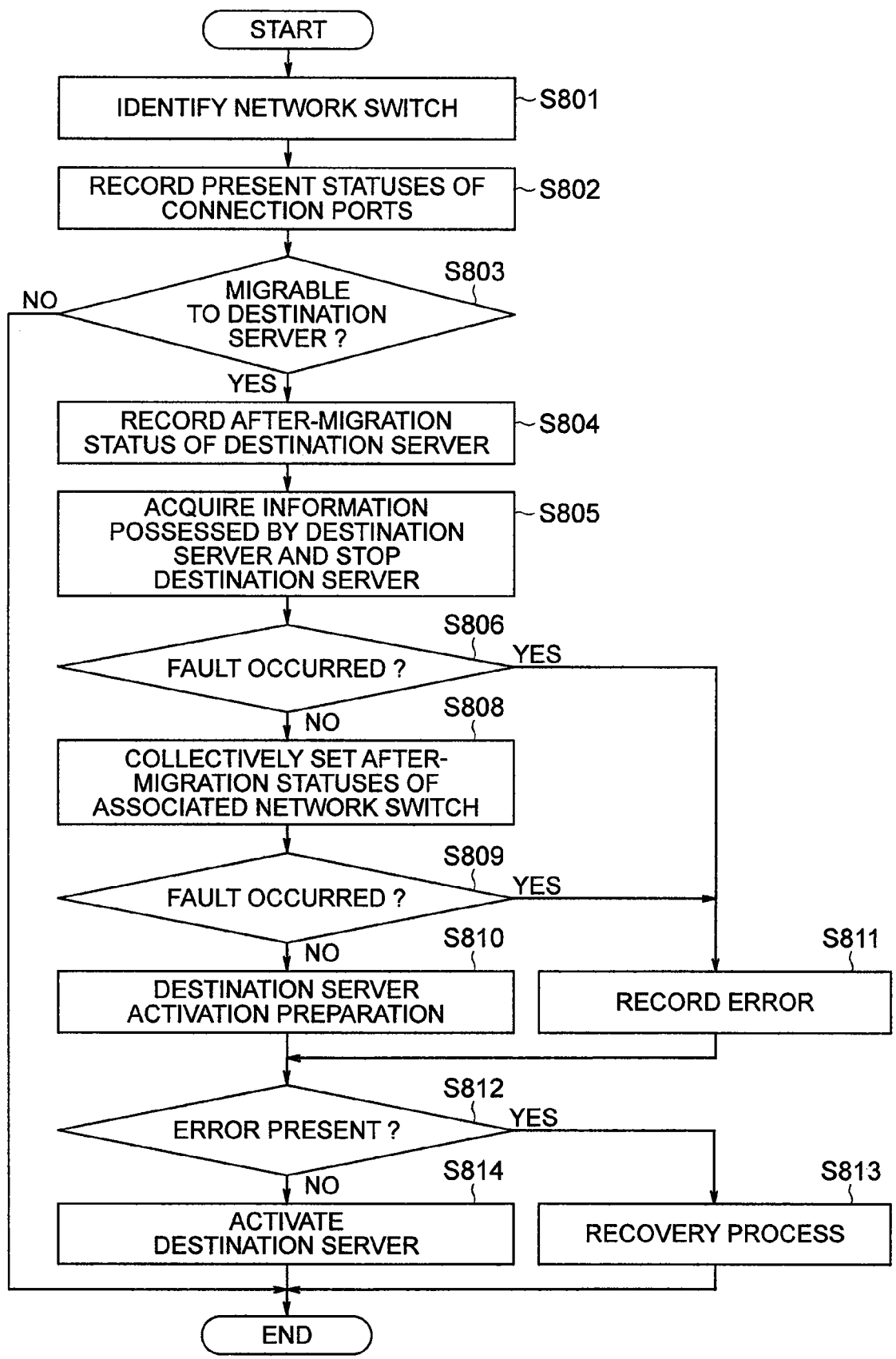
FIG. 8 is a flow chart illustrating a server migration process according to the first embodiment.

FIG. 8 is a flow chart illustrating the server migration process of the first embodiment. After the migration mechanism 131 starts the server migration process, the migration mechanism searches the server management table 137 to acquire a list of apparatuses requiring settings and identify a network switch (S801). More specifically, the migration mechanism searches the server management table 137 possessed by the server management unit 134 of the management server 130, by using the designated migration source physical server 100 as a key. Items of the server identifier 400 of the server management table 137 are searched to find a record in which information on the physical server 100 is recorded, and to acquire the apparatus identifier 408 "SWO0" of the connection destination information in the record. In this manner, it is identified that the network switch associated with the migration source physical server 100 is the network switching apparatus 120. A similar process is executed also for the migration destination virtual server 102 to identify that the relevant apparatus is the network switching apparatus 120.

Next, the migration mechanism 131 transmits via the management network a query to the network switching apparatus 120 identified at S801, acquires the present internal statuses of the ports 141 and 142 (P1 and P2) connected to the migration source physical server 100 and the ports 142 and 143 (P3 and P4) connected to the migration destination virtual server 102, and records the internal statuses in the apparatus status table 135 (S802).

Next, the migration mechanism 131 judges from the apparatus status table 135 whether the environment can be migrated to the migration destination virtual server 102 (S803). Whether the migration is possible or not is judged from the validity flag 502. For example, if the status of the validity flag 502 of the port number 501 of "P3" corresponding to the port 142 connected to the migration destination virtual server 102 indicates a fault, it means that the port 142 (P3) has a fault and it is judged that migration is impossible.

If the migration is impossible, the migration process is terminated.

Since resources necessary for settings for server migration have been identified by the processes of S801 to S803, the migration mechanism 131 extracts the after-migration statuses of the resources for the migration destination virtual server 102, and records the extracted statuses in the after-migration apparatus status 136 (S804). For example, attributes of the port numbers 501 of "P1" and "P2" corresponding to the ports 140 and 141 connected to the migration source physical server 100 are copied from the apparatus status table 135 recorded at S802, and records the attributes in the after-migration apparatus status 136 as the statuses of the attributes of the port numbers 601 of "P3" and "P4".

Next, the migration mechanism 131 acquires information possessed by the migration source physical server 100 via the management network, and after acquisition completion, stops the migration source physical server 100 (S805). For example, if disc images to be required after migration, such as a system disc image and a data disc image of the migration source physical server 100, are stored in a built-in disc of the migration source physical server, the disc images are copied to the management server 130 as the information on the migration source server. After copy completion, the migration source physical server 100 is stopped.

Next, the migration mechanism 131 judges whether a fault occurred during the process at S805 (S806), and if a fault occurred, an error is recorded (S811) to follow the process at S812. The status of the migration source physical server 100 is acquired from an agent (not shown) running on the migration source physical server 100, whereas information in the built-in disc of the migration source physical server is acquired by activating a new agent through network boot. In this case, a fault may occur because information cannot be acquired by a fault of the agent, because network boot of the new agent failed, because rebooting of the physical server 100 necessary for network boot failed, because the agent failed to mount the built-in disc, or other reasons.

If it is judged at S806 that a fault did not occur, then the migration mechanism 131 collectively sets the after-migration statuses to the resources in the network switching apparatus 120 (S808). More specifically, the migration mechanism 131 designates the after-migration apparatus status 136 and calls the status setting process 153 to be described later, performed by the setting management mechanism 123 of the network switching apparatus 120, via the management network.

Next, the migration mechanism 131 judges whether a fault occurred in the process at S808 (S809), and if a fault occurred, records an error (S811) to follow the process at S812. The error to be recorded in the process at S811 includes an error caused by check sum abnormality of a communication packet at a port to be set, an error caused by no wiring of a port to be set, an error caused by a fault of the management network for setting, and the like.

If it is judged at S808 that a fault did not occur, then the migration mechanism 131 prepares for activating the migration destination virtual server 102 (S810). In the activation preparation, for example, if the built-in disc of the migration source physical server 100 has system image and data, the system image and data are copied to the migration destination server 102 via the business network.

Next, the migration mechanism 131 judges from a record of errors whether there was any error (S812). If apparatus settings are completed normally and there is no error, then the migration mechanism 131 sends a server activation command to the server virtualization mechanism 106 via the management network to activate the migration destination virtual server 102 (S814) and thereafter terminate the migration process.

If it is judged at S812 that the apparatus settings were not completed normally and there was an error, the migration mechanism 131 executes a recovery process (S813). In the recovery process, the system administrator performs processes suitable for the fault situations while communicating with each associated apparatus from a management console connected to the management server 130 via the management network. There are the following items to be executed as a process generally performed independently from an error status.

(1) Acquisition of Error Status

An error status and each apparatus status are acquired. If the migration process by the migration mechanism 131 is stopped at an intermediate stage thereof because an error is detected, an error number corresponding to the stopped process is recorded. It is therefore possible to grasp at which process the error occurred.

(2) Acquisition of Apparatus Status

The server management table 137 is referred to identify associated apparatuses including the migration source physical server 100, migration destination virtual server 102 and network switching apparatus 120. A predetermined command is issued to each apparatus via the management network to acquire the status of each apparatus and the statuses of resources used by each apparatus.

(3) Identification of Cause of Fault

A cause of a fault is identified from the information obtained by (1) and (2). The cause is identified from the viewpoint of hardware, software, setting information, and operations. The cause includes a fault of hardware of each apparatus, an error of a process in the server migration process, an error of setting of each apparatus, an error of a parameter to be supplied during the migration process, and the like.

(4) Extraction of Status after Recovery

It is judged from the identified cause whether the running state before migration can be recovered. If possible, system starts again from the state before migration, whereas if not, the suitable operation is judged from the circumstances.

Figure 9:
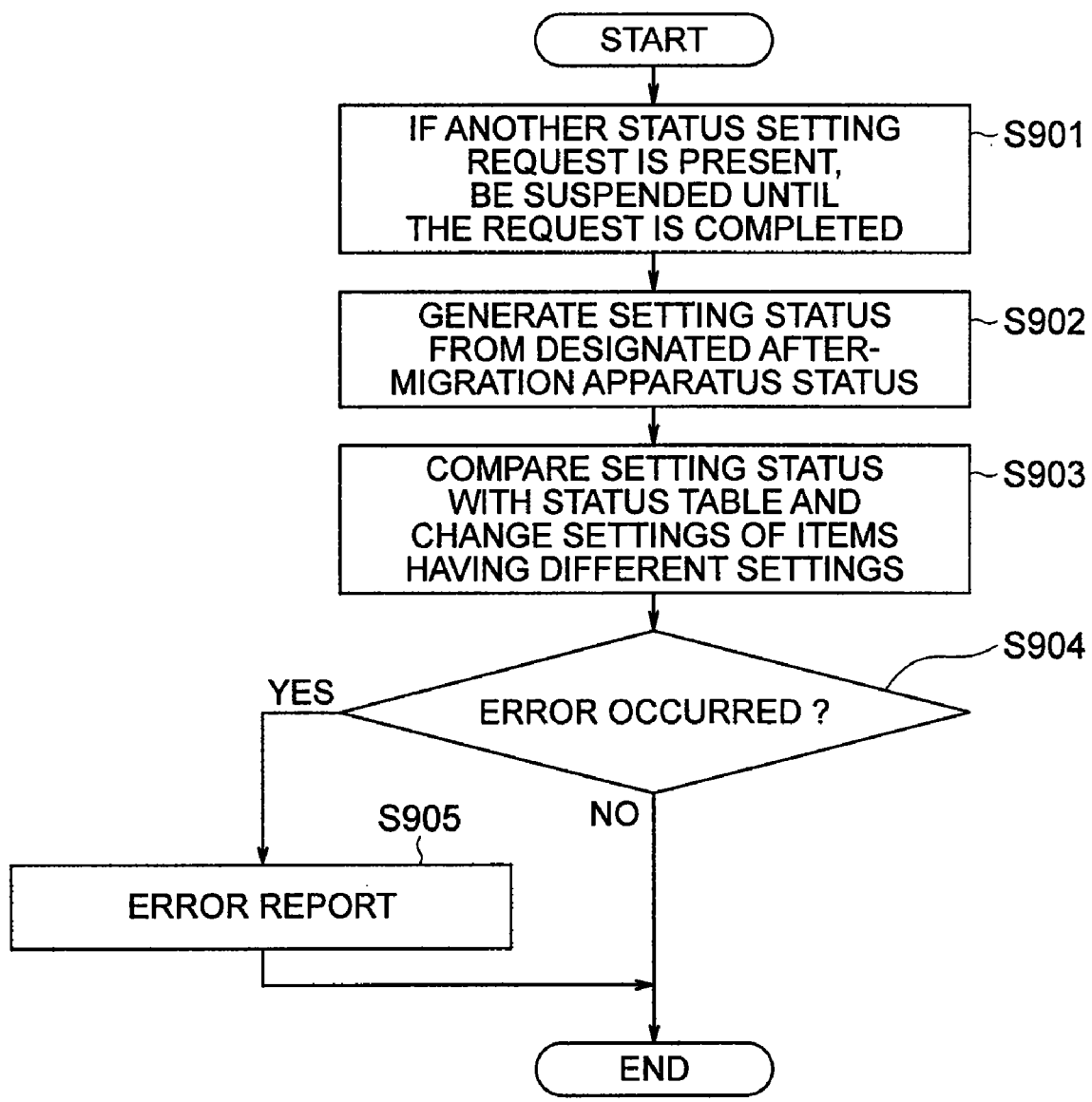
FIG. 9 is a flow chart illustrating a status setting process shown in FIG. 7

FIG. 9 is a flow chart illustrating the status setting process shown in FIG. 7. If the setting management mechanism 123 starts the status setting process 153 and there is another status setting request, the setting process is suspended until the request is completed (S901).

Next, the setting management mechanism 123 acquires the after-migration apparatus status 136 designated by the migration mechanism 131 to create the setting status 128 (S902). The setting management mechanism 123 compares the created setting status 128 with the status table 127 to extract items having different settings, and changes the settings of the status table 127 to the settings of the setting status 128 for the extracted items (S903). In this manner, during the status setting process, the management server 130 designates the after-migration apparatus status 136, the setting information 128 based upon the after-migration apparatus status is compared with the status table 127, and the items having different settings are changed to the settings of the setting status 128. It is therefore possible to collectively change settings of the network switching apparatus 120 connecting the migration source physical server 100 and migration destination virtual server 102.

In this embodiment, the setting status 128 shown in FIG. 3 is compared with the status table 127 shown in FIG. 2. Since the validity flags are different for the port numbers of "P1" and "P2", the "valid" of the validity flag 201 of the port numbers 200 of "P1" and "P2" is changed to the "invalid" set to the validity flag 301 of the port numbers 300 of "P1" and "P2". In addition to the validity flags, since the attributes VLAN-ID are different for the port numbers of "P3" and "P4", the "invalid" of the validity flag 201 of the port numbers 200 of "P3" and "P4" is changed to the "valid" set to the validity flag 301 of the port numbers 300 of "P3" and "P4", and "Def" of VLAN-ID 202 of the port numbers 200 of "P3" and "P4" is changed to "100" of VLAN-ID 302 of the port numbers 300 of "P3" and "P4". "Def" means a default VLAN.

Next, the setting management mechanism 123 judges whether an error occurred in the process at S903 (S904). If an error did not occur, the status setting process 153 is terminated, whereas if an error occurred, an error is reported to thereafter terminate the status setting process. 153.

As described above, according to the embodiment, during the status setting process, the management server 130 designates the after-migration apparatus status 136, the setting information 128 based upon the after-migration apparatus status is compared with the status table 127, and the items having different settings are changed to the settings of the setting status 128. It is therefore possible to collectively change settings of the network switching apparatus 120 connecting the migration source physical server 100 and migration destination virtual server 102. It is therefore unnecessary to perform separately a plurality of settings for the migration source server and migration destination server, as in the conventional case. Accordingly, settings of the network switching apparatus 120 connecting the migration source physical server 100 and migration destination virtual server 102, which essentially require a plurality of settings for server migration, can be completed by a single operation, and server migration can be made easily.

Next, the second embodiment of the present invention will be described with reference to FIGS. 10 to 16. First, the structure of the second embodiment will be described with reference to FIGS. 10 to 13. Similar constituent elements and operation portions to those of the first embodiment are represented by identical reference symbols, and the detailed description thereof is omitted.

There are two different points between the second and first embodiments. The first different point resides in that a network interface of a virtual server is resultantly not directly mapped to a physical NIC. The other point resides in a timing when the virtual server is configured. In the first embodiment, the migration destination virtual server 102 is configured by a system administrator or the like before the server migration process is executed by the migration mechanism 131. In contrast, in the second embodiment, only a specification needed for a migration destination server is designated, and the migration destination virtual server is configured in the server migration process to be executed by the migration mechanism 131. Configuring the virtual server in the server migration process is divided into two stages. The first stage is a stage of reserving resources necessary for virtual server configuration, and at the first stage a virtual server configuration possibility is judged. At the second stage virtual resources from physical resources are formed, and the virtual resources are assigned to configure the virtual server. The after-migration apparatus status 136 regarding the migration destination server is therefore different from the first embodiment, and is not set in advance. Since the migration destination virtual server is configured during the server migration process, an administrator writes in advance requirements for the configuration of the migration destination server in a reservation table 1004 of the management server 130 to be described later.

Figure 10:
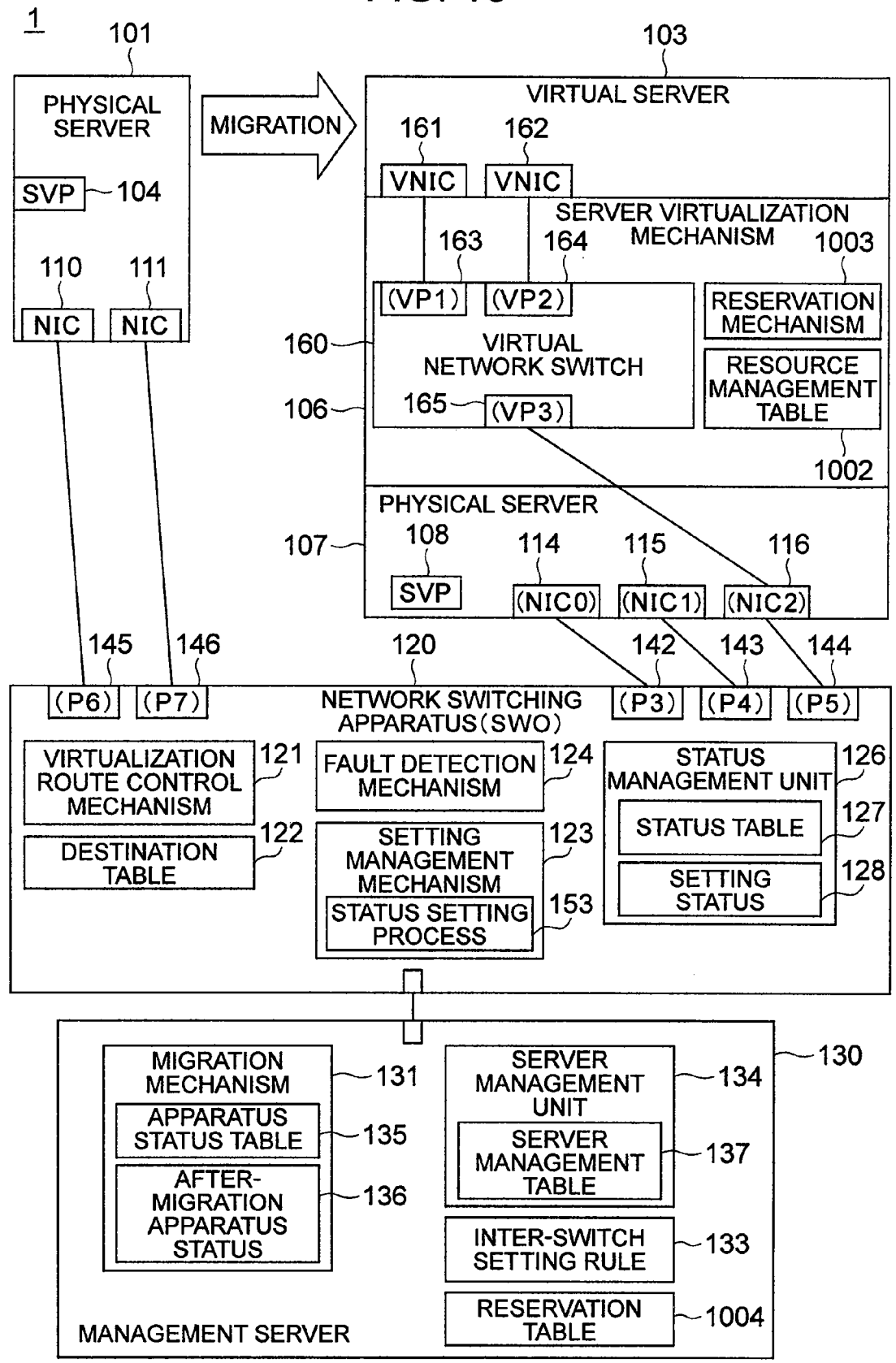
FIG. 10 is a schematic diagram illustrating the structure of a server system regarding server migration according to a second embodiment.

FIG. 10 is a schematic diagram illustrating the outline structure of a server system regarding server migration according to the second embodiment. In the second embodiment, as shown in FIG. 10, an execution infrastructure of a physical server 101 is migrated to a virtual server 103 on a physical server 107. FIG. 10 shows the structure after physical resources are assigned actually after completion of the second stage.

A server virtualization mechanism 106 has a reservation mechanism 1003, a resource management table 1002 and a virtual network switch 160. The reservation mechanism 1003 responds to a request from the management server 130 and executes a reservation process for executing the first stage for virtual server configuration, a resource assignment process for actually assigning resources as the second stage, and a reservation cancel process for canceling reservation. The resource management table 1002 records statuses of all resources including resources of the virtual network switch 160 and managed by the server virtualization mechanism 106. The virtual network switch 160 performs similar settings to those of the network switching apparatus 120, and has a virtual port 165 (VP3) connected to the network switching apparatus 120, and virtual ports 163 and 164 (VP1 and VP2) connected to the virtual server 103. Virtual network interfaces (hereinafter called VNIC) 161 and 162 are connected to the network switching apparatus 120 via the virtual network switch 160 realized by the server virtualization mechanism 106 and to a physical NIC116 (NIC2) of the physical server 107 on which the server virtualization mechanism 106 exists.

More specifically, the virtual server 103 has two VNICs 161 and 162 which are connected to the virtual ports 163 and 164 (VP1 and VP2) of the virtual network switch 160 (VSW), respectively. Connection of the network switching apparatus 120 is established via a physical NIC116 (NIC2) of the physical server 107. The physical NIC116 is virtualized and mapped to the virtual port 165 (VP3) of the virtual network switch 160.

Since the virtual port 165 (VP3) and a physical port 144 (P5) are connected between network switches, there is a possibility that a plurality of VLANs are set at each network switch. Therefore, a link between both the ports is configured in a structure that a plurality of VLANs are assigned to one port, i.e., a tag VLAN structure. The server virtualization mechanism 106 realizes the virtual port 165 (VP3) having such a structure by using NIC116 (NIC2) of the physical server 107.

In order to configure a migration destination virtual server in the server migration process to be executed by the migration mechanism 131 of the management server 130, in the reservation table 1004 of the management server 130 resources necessary for configuring the virtual server are recorded.

If a plurality of network switches are involved between a migration source physical server and a migration destination virtual server, settings of inter-network-switches necessary for making settings at ports connecting both the servers operate correctly are recorded in an inter-switch setting rule 133. For example, if a VLAN is set to a port (port VLAN) connecting some other port via network switches, VLAN configuration is realized by tag VLAN between network switches. In order to realize this, a rule that the tag VLAN is used between network switches for VLAN configuration, is recorded. It is therefore unnecessary to individually perform settings between network switches.

FIG. 11 is a diagram illustrating the structure of the reservation table shown in FIG. 10. As the reservation table 1004 there is a table shown in FIG. 11 for each assigning virtual server. Each record records a specification of resources constituting a virtual server. The reservation table 1004 is constituted of a resource ID 1101, a resource type 1102, a model number 1103, a specification 1104, a setting statement 1105, a selection priority 1106 and an assignability 1107.

The reservation table 1004 is prepared beforehand by an administrator, and has the items 1101 to 1106 for necessary resources. If there are a plurality of candidates for some resource type 1102, it is expected that the same model number, specification and setting statement are entered for a plurality of candidates having the same priority 1106. For example, as shown in FIG. 11, for the resource type 1102 of "CPU", the contents of the model number 1103, specification 1104 and setting statement 1105 of the records 1111 and 1112 having the selection priority of "5" are the same. This is also true for the records 1113 to 1116 having the priority of "3" and "1".

The resource ID 1101 is a unique ID of each resource. The resource type 1102 records the type of resource to be designated. For example, as shown in FIG. 11, the record type records the type of an apparatus constituting a server, such as a CPU, a NIC, a SCSI (SCSI adapter) and an FC-HBA (Fibre channel host bus adapter). If even the same apparatus type is desired to be divided into different types for the selection purposes of resource assignment, "- number" is added to the initial type to present a different type. For example, for a hard disc (HDD) shown in FIG. 11, since different resource types 1102 are required to be assigned to the resource IDs 1101 of "LV0" and "LV1", different types "HDD-1" and "HDD-2" are recorded.

The model number 1103 records a model number capable of uniquely determining the specification of the type of each apparatus. For example, in the case of NIC, the model number of NIC becomes different if a vender is different, and the model number of NIC becomes different if a specification such as a network band width is different even if NIC is provided from the same vendor. The specification 1104 records a specification description corresponding to the model number 1103. This item is used for searching the requested resource if the resource cannot be searched from only the model number 1103. For example, there are a plurality of records corresponding to the resource ID 1101 of "CPU0". These records correspond to a server specification for the model number 1103 of "XA0001", a server specification for the model number 1103 of "XA0001B" and a server specification without model number designation (in this case, "*" is recorded in the model number 1103 item in FIG. 11) and with a specification 1104 indicating only "made of A company, 2 GHz >". In the last server specification, the contents of the specification 1104 indicates that "speed of CPU made of A company is 2 GHz or higher". If the model number 1103 is designated, the server specification is clear from the model number 1103 so that the specification1104 has only meaning of information supplementing the model number 1103.

The setting statement 1105 records settings of each apparatus. Individual settings and a priority of settings are juxtaposed with a separator being inserted therebetween. In FIG. 11, the priority is written between parentheses and the separator is represented by ":". If a plurality of settings are given the same priority, the plurality of settings are partitioned by "," and the priority is added to the last. The priority has three levels. "High" means that it is always necessary to follow the settings recorded in the setting statement 1105, "Middle" means that it is preferable to follow the settings recorded in the setting statement 1105, and "Low" means that it is not necessary to follow the settings recorded in the setting statement 1105. In actual, the meaning is strictly decided for each setting. For example, for the resource ID 1101 of "CPU0" in the first record shown in FIG. 11, the setting statement 1105 indicates that "CPU is dedicately assigned, a hyperthread function (HT) is turned off, and each priority is "High".

The selection priority 1106 records a priority when there are a plurality of candidates for a requested resource. A proper positive number is given to the priority, and the larger the number, the higher the priority. The assignability 1107 records a judgment result of whether or not resources can be assigned while the server virtualization mechanism 106 performs a reservation process for virtual server configuration. The judgment result records "E" (assignable), "D" (unassignable) or "M" (assignable with modification).

FIG. 12 is a diagram illustrating the structure of the resource management table shown in FIG. 10. The resource management table 1002 is constituted of a resource type 1201, a settable item 1202, a resource ID 1203, a virtual/real flag 1204, a model number 1205, a specification 1206, and an assignment status 1207. Of these items, the resource type 1201, model number 1205 and specification 1206 are the same as corresponding ones in the reservation table 1004 shown in FIG. 11.

The settable item 1202 has a settable item for the resource indicated by the resource type 1201. In FIG. 12, for example, for the resource type 1201 of "CPU", the settable item indicates that "occupancy/shared, ON/OFF of hyperthread function (HT) and the like are settable", and for the resource type 1201 of "NIC", the settable item indicates that "dedicated/shared and tag VLAN are settable".

The resource ID 1203 has an identifier of each resource managed by the resource management table 1002. The virtual/real flag 1204 indicates whether each resource is a virtual resource or physical resource. The assignment status 1207 has a resource assignment status of each record, and consists of a flag indicating an assignment status and the details of assignment. The assignment status flag has three statuses corresponding to an assigned status, an unassigned status and an assignment reserved status. In FIG. 12, "assigned" means an assigned status, "unassigned" means an unassigned status, and "reserved" means an assignment reserved status. The assignment details have setting items of the actually assigned resources, i.e., resources having the assignment flag of "assigned", and if the resource is a virtual resource, they have a necessary physical resource. For example, for the resource ID 1203 of "VCPU0" in the first record shown in FIG. 12, the assignment status indicates that "dedicated assignment is set, and physical CPU=CPU0 is designated as a necessary physical resource".

A record having the resource ID 1203 of "*" means virtual resource still not assigned, and the details of the assignment status have an amount of assignable resources. For example, for the resource type 1201 of "CPU" shown in FIG. 12, the assignment details regarding the resource ID 1203 of "*" indicate that "the number of assignable CPUs is 14". A number in parentheses means an amount of reserved resources, and is "1" in this example. The resource of the resource ID 1203 of "VCPU4" is only one reserved resource among the resource IDs 1201 of "CPU".

All physical resources managed by the server virtualization mechanism 106 have their records. For example, for the resource type 1201 of "CPU", the resource IDs 1203 from "CPU0" to "CPU3" correspond to records for recording physical CPUs with the virtual/real flags 1204 of "physical". Only these physical CPUs can be used by the server virtualization mechanism 106 as a physical CPU resource.

Next, with reference to FIGS. 13 to 16, description will be made on the operation of server migration for migrating an execution environment from a physical server to a virtual server.

In this embodiment, the server migration process to be executed by the migration mechanism 131 is fundamentally the same as the server migration process of the first embodiment shown in FIG. 8. Main different points reside in that at the first stage for virtual server configuration, since the virtual server is configured during migration after the reservation of the configuration of the migration destination server 103, the configuration of the migration designation server is not registered in the server management table 137 at the time of migration start, and that a plurality of network switches are involved between the migration source server and migration destination server. Another different point from the first embodiment resides in that the reservation table 1004 is designated when the migration mechanism 131 is called in order to set the configuration of the migration destination server. In the following, description will be made centering on these different points.

Figure 13:
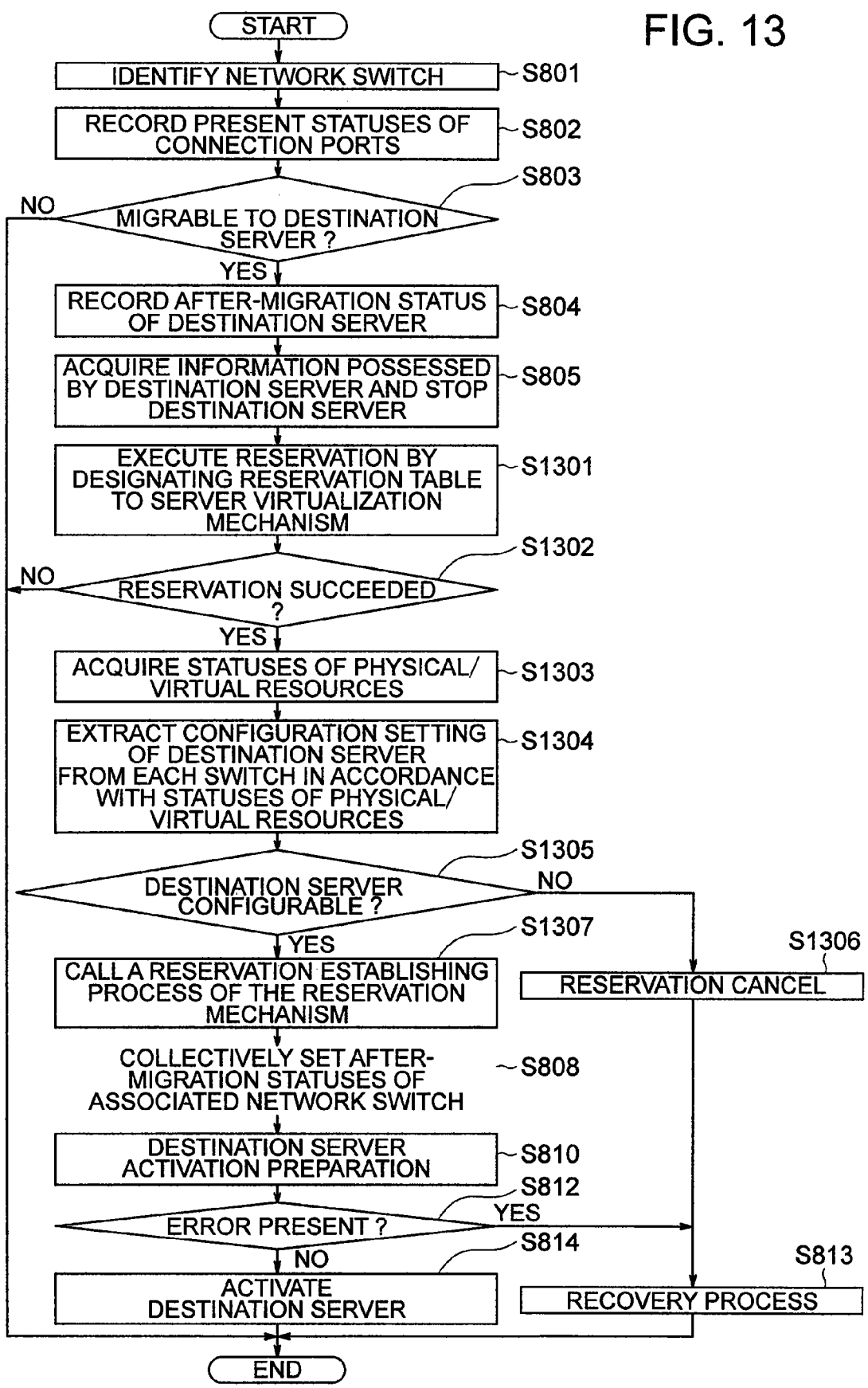
FIG. 13 is a flow chart illustrating a server migration process of the second embodiment.

FIG. 13 is a flow chart illustrating the server migration process according to the second embodiment. The reservation table 1004 formed in advance is designated, and the migration mechanism 131 executes the migration process. At S801, when information on apparatuses associated with migration is acquired, the server management table 137 is searched to identify the network switch. In this embodiment, since the migration destination virtual server 103 is not yet configured, an entry for the migration destination virtual server 103 does not exist. Therefore, at this time only the network switching apparatus 120 (SW0) is added to an apparatus list. The server management table 137 shown in FIG. 4 has the contents at the time when the final resource assignment is completed.

At S802 the present statuses of connection ports are acquired and recorded in the apparatus status table 135. In this embodiment, recorded for the network switching apparatus 120 (SW0) are information on the ports 145 and 147 (P6 and P7) to which the migration source physical server 101 is connected and information on the ports 142, 143 and 144 (P3, P4 and P5) to which the physical server 107 on which the migration destination virtual server 103 runs is connected. The recorded information is as shown in FIG. 5. At this time, those ports 145 and 146 (P6 and P7) of the network switching apparatus 120 (SW0) to which the migration source physical server 101 is connected are valid, VLAN of VLAN-ID=110 is set, a frame length is compatible with a jumbo frame, a speed is 1 GB/s, and etc. The port 144 (P5) to which the migration destination physical server 107 is connected is invalid.

The statuses of ports and the like are judged at S803. If it is judged as a migration is possible, then at S804 the statuses after migration of the resources associated with the migration destination virtual server 103 are extracted from the apparatus status table 135 and recorded in the after-migration apparatus status 136. In this embodiment, it is sufficient if settings themselves at the ports 145 and 146 (P6 and P7) of the network switching apparatus 120 (SW0) connected to the migration source physical server 101 are extracted. Namely, the ports P6 and P7 are valid, VLAN of VLAN-ID=110 is set, a frame length is compatible with a jumbo frame, a speed is 1 GB/s, and etc. Next, at S805, after information (contents in the server built-in disc and the like) possessed by the migration source physical server 101 is acquired, the migration source physical server 101 is stopped.

Next, the migration mechanism 131 performs the processes at S1301 to S1307 instead of S805 and S811 in the migration process of the first embodiment.

Namely, the migration mechanism 131 calls a reservation process to be described later in the reservation mechanism 103 for the migration destination server virtualization mechanism 106, by using the reservation table 1004, in order to configure the migration destination virtual server (S1301). The reservation process assigns a server having the configuration designated by the reservation table 1004, and returns a result. The results contain an ID representing an assigned virtual server, reservation result like failed, success and changed and its reason for each resource designated by the reservation table 1004. A meaningful value is returned as the virtual server ID only when there is no assignment failure for each resource. For example, in the reservation table 1004 shown in FIG. 11, a virtual CPU (shared CPU) is assigned because the number of physical CPUs is insufficient, and the flags of the assignability 1107 for the resource type 1102 of "CPU" have "D" (unassignable) for the records 1111, 1112, 1114 and 1116 and "E" (assignable) for the records 1113 and 1115. For the resource type 1102 of "NIC", since the number of physical NICs is insufficient, both the resource IDs 1101 of "NIC0" and "NIC1" have the assignability 1107 flag of "M" (assignable with modification), and the setting statement 1105 of "dedicated" is changed to "shared".

Next, the migration mechanism 131 judges whether the reservation succeeds, in accordance with the result of the reservation process call at S1301 (S1302), and if the reservation fails, terminates the migration process. If the reservation succeeds, the migration mechanism 131 issues an inquiry to the server virtualization mechanism 106, to acquire information of relevant resources such as the virtual network switch 160 (VSW) and a physical network interface card of the physical server 107 (S1303). The acquired resource information has the same contents as those of the resource management table 1002 shown in FIG. 12 managed by the server virtualization mechanism 106. The concrete information on resources shown in FIG. 12 includes information on assignable idle ports and statuses of the idle ports, for the virtual network switch 160 (VSW), and fault status, setting statuses, statuses of other virtual servers, for physical network interface cards.

In accordance with the statuses of the resources of the physical server 107 acquired at S1303, settings of the migration destination server are extracted (S1304). The after-migration apparatus status 136 is finally determined from the reservation results and resource statuses at S1301 and the statuses in the server management table 137. For the reservation results, for example, as shown in the assignability flag 1107 shown in FIG. 11, resource reservation as requested is completed for SCSI and HDD. One of the candidates of CPUs is selected and a virtual CPU is reserved. For NIC, dedicated assignment is impossible, and a virtual NIC is assigned.

As the resource information, information in the resource management table 1002 shown in FIG. 12 can be acquired at S1303. VCPU4 is reserved for CPU. VNIC2 and VNIC3 are reserved as the shared NICs for NIC. For the ports of the virtual network switch, none is assigned, and it is indicated that 64 ports at a maximum are assignable (refer to the record of the resource type "PT" in the resource management table shown in FIG. 12).

Configuration settings of the migration destination server are extracted in accordance with the above-described information and the following procedure.

(1) By referring to the information regarding NIC in the reservation results obtained at S1301, it is confirmed whether the assigned NIC is a virtual NIC or a physical NIC.
(2) If the assigned NIC is a physical NIC, the process advances to (10).
(3) If the assigned NIC is a virtual NIC, connection to the virtual network switch 160 is required. Therefore, by referring to the resource information, an assignable port of the virtual network switch 160 is selected. If there is no proper port, the process is terminated by returning a result showing that it is impossible to configure migration destination server.
(4) In order to connect the virtual network switch 160 and the network switching apparatus 120 acquired at S801, an available physical NIC to be connected to the network switching apparatus 120 is acquired by referring to the server management table 137 and resource information. If such a physical NIC does not exist, the process is terminated by returning a result showing that it is impossible to configure migration destination server.
(5) In order to assign a virtual port created through virtualization of the physical NIC selected at (4), a port of the virtual network switch 160 is selected. If there is no proper port, the process is terminated by returning a result showing that it is impossible to configure migration destination server.
(6) By referring to the server management table 137, a plurality of ports of the network switching apparatus 120 connected to the physical NIC selected at (4) are identified.
(7) By referring to the inter-switch setting rule 133 based upon the after-migration statuses extracted at S804, settings are determined for the port of the virtual network switch 160 selected at (5) and for the ports identified at (6).
(8) Newly required resources among the settings determined above are reserved by calling the reservation mechanism 1003. If the reservation fails, the process is terminated by returning a result showing that it is impossible to configure migration destination server.
(9) The settings determined above are reflected upon the after-migration apparatus status 136, and the process is terminated by returning a result showing that it is possible to configure migration destination server.
(10) By referring to the server management table 137, a port of the network switching apparatus 120 connected the physical NIC is determined.
(11) The after-migration statuses extracted at S804 are used as the setting contents of the port determined at (9).
(12) The settings determined above are reflected upon the after-migration apparatus status 136, and a process is terminated by returning a result showing that it is possible to configure migration destination server.

The above-described procedure will be described in the following specific example of the embodiment.

(1) Assuming that the reservation results obtained at S1301 are the same as those in the reservation table 1004 shown in FIG. 11, the reservation results are returned by recording assignability in the assignability 1107 of the reservation table 1004, and if there are modifications, the modifications are incorporated into in the model number 1103, specification 1104 and setting statement 1105. The assignability is recorded in the assignability 1107 shows in FIG. 11 as the reservation result, and for modification of the setting statement 1105, the modified contents are recorded after an arrow "→" in the item of the setting statement 1105. The assignability 1107 of the records (having the resource IDs 1101 of "NIC0" and "NIC1") having the resource type 1102 of "NIC" is "M" (assignable with modification), and in this case it is confirmed that the setting statement 1105 is changed from "dedicated" to "shared". This means that the resource IDs 1101 of "NIC0" and "NIC1" are virtual NICs.
(2) Since NIC is not the physical NIC, the process advances to (3).
(3) By referring to the record having the resource type 1201 of "PT" in the resource management table 1002 shown in FIG. 12 recording resource information and the record having the resource ID 1203 of "*", it is confirmed that the number of assignable virtual ports of the virtual network switch 160 is "64", and it is determined that two virtual ports among them are assigned. The two ports are named "VP1" and "VP2".
(4) By referring to the server management table 137 shown in FIG. 4, it can be known that physical NICs of the physical server 107 connected to the network switching apparatus 120 (SW0) are NIC0, NIC1 and NIC 2. Next, by referring to the resource management table 1002 shown in FIG. 12 recording resource information, for the resource ID 1203 of "NIC2", it is judged from the assignment status 1207 that this resource is not used and is assignable.
(5) In order to select a port of the virtual network switch 160 as a virtual port created through virtualization of NIC 2 selected at (4), the record having the resource type 1201 of "PT" is referred in the resource management table 1002 shown in FIG. 12 recording resource statuses. Since it can be known that "62" virtual ports are not used excepting the two ports assigned at (3), it is determined to assign one port. This port is named "VP3".
(6) By referring to the server management table 137 shown in FIG. 4, it is identified that the port number 409 of the network switching apparatus 120 (SW0) connected to NIC2 selected at (4) is "P5". At this time it can be known that ports of a link connecting the virtual network switch 160 (VSW) and physical network switching apparatus (SW0) are "VP3" and "P5", respectively.
(7) The after-migration settings extracted at S804 from the apparatus status table 135 shown in FIG. 5 indicate that "the ports VP1 and VP2 are valid, VLAN of VLAN-ID=110 is set, a frame length is compatible with a jumbo frame, a speed is 1 GB/s, there is no aggregation and no security and QoS is not set". By referring to the inter-switch setting rule 133, a tag VLAN of VLAN-ID=110 is set between VP3 and P5 for VLAN setting.
(8) The virtual ports "VP1". "VP2" and "VP3" are reserved as resources to be newly added, by calling the reservation mechanism 1003.
(9) If the reservation succeeds, the following contents are set to the after-migration apparatus status 136. For the virtual network switch 160 (VSW), the setting contents of the virtual ports "VP1" and "VP2" are that "the ports VP1 and VP2 are valid, VLAN of VLSN-ID=110 is set, a frame length is compatible with a jumbo frame, a speed is 1 GB/s, there is no aggregation and no security and QoS is not set". The setting contents of "VP3" are that "the port VP3 is valid, a tag VLAN of VLSN-ID=110 is set, a frame length is compatible with a jumbo frame, a speed is 1 GB/s, there is no aggregation and no security and QoS is not set". Similar settings to those of "VP3" are used for "P5". After the settings are completed, the process is terminated by returning a result showing it it possible to configure migration destination server.

FIG. 14 is a diagram illustrating the structure of the after-migration apparatus status shown in FIG. 10. The after-migration apparatus status 136 formed in accordance with the configurations determined as above shows the settings of the virtual network switch 160 (VSW) in the upper table and the settings of the network switching apparatus 120 (SW0) in the lower table. The ports 145 and 146 (P6 and P7) of the network switching apparatus 120 connected to the migration source server are invalidated, and the virtual ports 163 and 164 (VP1 and VP2) of the virtual network switch 160 (VSW) inherit the settings of the ports 145 and 146 (P6 and P7) to set VLAN-ID and jumbo frame. A tag LAN and jumbo frame are set for the virtual ports 165 (VP3) and port (P5) as the ports of a link connecting both the network switches. A port number 1401 in the upper table in FIG. 14 corresponds to a VLAN-ID 1403, the port number 501 in the lower table corresponds to a VLAN-ID 503 of "P5", and "T110" is a tag VLAN and indicates that VLAN-ID is 110.

Next, the migration mechanism 131 judges from the results at S1304 whether the migration destination virtual server can be configured (S1305). If the migration destination server cannot be configured, a reservation cancel process of the reservation mechanism1003 is called to cancel the reservation (S1306) and the server migration process is terminated via a recovery process at S813.

If the migration destination virtual server can be configured, the migration mechanism 131 calls a reservation establishing process of the reservation mechanism 1003 for reservation establishment (S1307). In the example of this embodiment, the reserved virtual resources (VCPU4, VNIC2, VNIC3, VP1, VP2 and VP3) are established to enter an assigned status.

Next, at S808 the migration mechanism 131 designates the after-migration apparatus status 136 to call the status setting process 153 of the setting management mechanism 123 and to collectively perform setting of the resources including the assigned resources. With these processes, virtual server assignment and settings of necessary resources respectively necessary for server migration have been completed. Therefore, similar to the first embodiment, the migration mechanism 131 prepares for activating the migration destination server at S810, thereafter it is judged at S812 whether there is any error, and the migration destination virtual server 103 is activated at S814 to thereafter terminate the migration process.

Next, description will be described on the reservation process provided by the reservation mechanism 1003 on the physical server 107. The reservation process is called by designating the reservation table 1004 shown in FIG. 11 from the migration mechanism 131. The reservation process judges whether the virtual server having the resources written in the reservation table 1004 can be configured, and reserves the virtual resources of the virtual server to be configured. However, physical resources necessary for creating the virtual resources are not assigned. For example, although a physical NIC is required since the resource type 1102 of "NIC" in the reservation table 1004 shown in FIG. 11 has the setting statement 1105 of "dedicated", the physical NIC is not actually assigned at this time. There is a case that the physical resources are not required as in the case that the setting statement 1105 is "shared" (the case of no designation of "dedicated").

Figure 15:
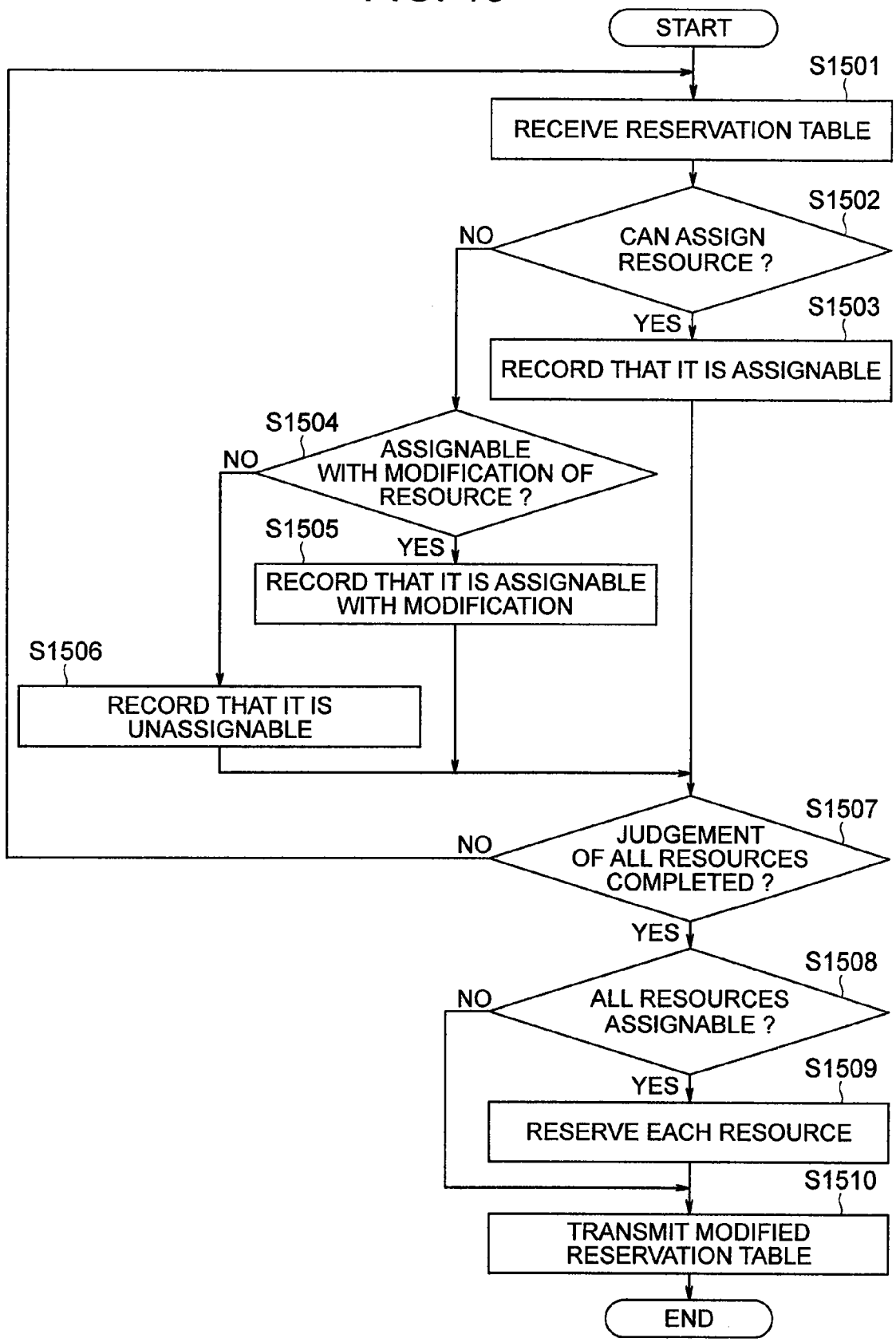
FIG. 15 is a flow chart illustrating the operation of a reservation mechanism shown in FIG. 10.

FIG. 15 is a flow chart illustrating the operation of the reservation mechanism shown in FIG. 10. First, the reservation mechanism 1003 receives the reservation table 1004 from the migration mechanism 131 running on the management server 130 (S1501). Next, the reservation mechanism 1003 sequentially checks each record of the reservation table 1004 to judge whether the resource indicated by each record can be assigned (S1502). If the judgment result indicates it is assignable, "E" is recorded in the item of the assignability 1107 (S1503), whereas if it indicates unassignable, it is judged whether the resource indicated by each record can be assigned by modifying the request for the resource (S1504). If the judgment result indicates it is assignable with modification, "M" is recorded in the item of the assignability 1107 (S1505), whereas assignment with modification is not impossible, i.e., if it is not assignable, "D" is recorded in the item of the assignability 1107 (S1506). In this manner, the reservation mechanism 1003 reserves, during the server migration process, the resources of the physical server necessary for configuring the migration destination virtual server 103. It is therefore possible to perform server migration even if the migration destination virtual server 103 is not yet configured before the server migration process.

In the detailed description of the processes at S1502 to S1506, the following procedure is performed for each record having the same resource type 1102. If the essentially same type is divided into different types by using "- number", the divided type is considered as a different type and separately judged. However, when the resource management table 1002 is to be searched, the search is performed by the essential type by omitting the "- number".

(C1) Each record is rearranged in accordance with the selection priority 1106 to use the rearranged records as a list of candidates for assignment judgment.

(C2) Candidate records having the highest selection priority 1106 are selected from the the current list of candidates. In this case, a plurality of records having the same selection priority are extracted. The resource ID 1101 of each record is different.

(C3) It is judged whether resources suitable for the candidate records selected at (C2) exist, by referring to the resource management table 1002 managed by the server virtualization mechanism 106.

(C4) If any resource suitable for any of the candidate records exists, "assignable" is used as a result of the candidate records, and if there are left other candidate records which have no suitable resources, the left candidate records are given "unassignable" to thereafter terminate the judgment. If there are no candidate records to be judged, the process advances to the next.

(C5) The judged candidate records are removed from the list of candidates.

(C6) If there are left candidate records in the list of candidates, the process returns to (C2) to perform assignment judgment.

(C7) If any candidate record is not left in the list of candidates, the judgment is terminated.

When the resource is searched by using the resource management table 1002 at (C3), the search is performed based upon the model number 1103 of the reservation table 1004 shown in FIG. 11 if the model number is recorded, and judgment is made. If the model number 1103 is "*", i.e., if any model number is allowed, the specification 1104 is searched, and the resource management table 1002 is searched by using as a key the item designated in the specification 1104. If a proper resource is found, the model number of the found resource is entered in the model number 1103, and "assignability with modification" is used as a result. If a priority of each setting of the setting statement 1105 is "middle" or "low" and resource assignment becomes possible through modification of the setting, the modification contents are reflected upon the setting statement 1105, and "assignability with modification" is used as a result.

Description will be made more specifically. In the reservation table 1004 shown in FIG. 11, the records 1111 to 1116 have the resource type 1102 of "CPU". The following processes are executed for the resource type 1102 of "CPU".

(C1) The records 1111 to 1116 are rearranged in accordance with the selection priority 1106, and in a list of candidates for assignment judgment candidate records are listed in the order of the records 1111, 1112, 1113, 1115, 1114, and 1116.

(C2) The records 1111 and 1112 having the highest selection priority 1106 of "5" are selected from the list of cadidates.

(C3) The resource management table 1002 is referred to search the resources corresponding to the records 1111 and 1112.

(C4) In this case, since only one physical CPU is available in the resource management table 1002, dedicated assignment cannot be made so that "D" (unassignable) is set to the assignability 1107 for the records 1111 and 1112.

(C5) The records 1111 and 1112 are removed from the list of candidates for assignment judgment.

(C6) Since there are the records 1113, 1115, 1114 and 1116 left in the list of candidates, the process returns to (C2).

(C2) The records 1113 and 1115 are selected as having the next highest priority.

(C3) By referring to the resource management table 1002, resources corresponding to the records 1113 and 1115 are searched.

(C4) Since dedicated assignment is not designated in the setting statement of the records 1113 and 1115, a virtual CPU can be assigned so that "E" (assignable) is set to the assignability 1107 of the records 1113 and 1115. "D" (unassignable) is set to the assignability 1107 of the other records 1114 and 1116 to thereafter terminate the process.

For the resource class 1102 of "NIC", since the setting statement 1105 indicates "dedicated", as dedicated NIC resources it is tried to be assigned to the resource IDs 1101 of "NIC0" and "NIC1". However, as the resource management table 1002 is checked, there is only one idle physical NIC to be dedicated so that "D" (unassignable) is once set to the assignability 1107. Next, since the priority of the setting statement 1105 is "middle", a virtual NIC can be assigned and "dedicated" is changed to "shared". Therefore, "M" (assignable with modification) is set to the assignability 1107 and the setting statement 1105 is changed from "dedicated" to "shared".

Next, the reservation mechanism1003 judges whether judgment has completed for all resource types 1102 (S1507), and if not completed, the process returns to S1502, whereas if completed, the reservation mechanism1003 judges whether all resource types 1102 are able to be assigned (S1508). If judgment results indicate that "E" (assignable) or "M" (assignable with modification) is set to the assignability 1107 for all requested resource types 1102, the reservation mechanism1003 performs reservation (S1509) and returns the reservation table 1004 reflecting the results to the migration mechanism 131 (S1510) to thereafter terminate the reservation process. If even one "D" (unassignable) is set to the assignability 1107, the reservation is not performed, but the reservation table 1004 is returned to the migration mechanism 131 (S1510) to thereafter terminate the reservation process.

Figure 16:
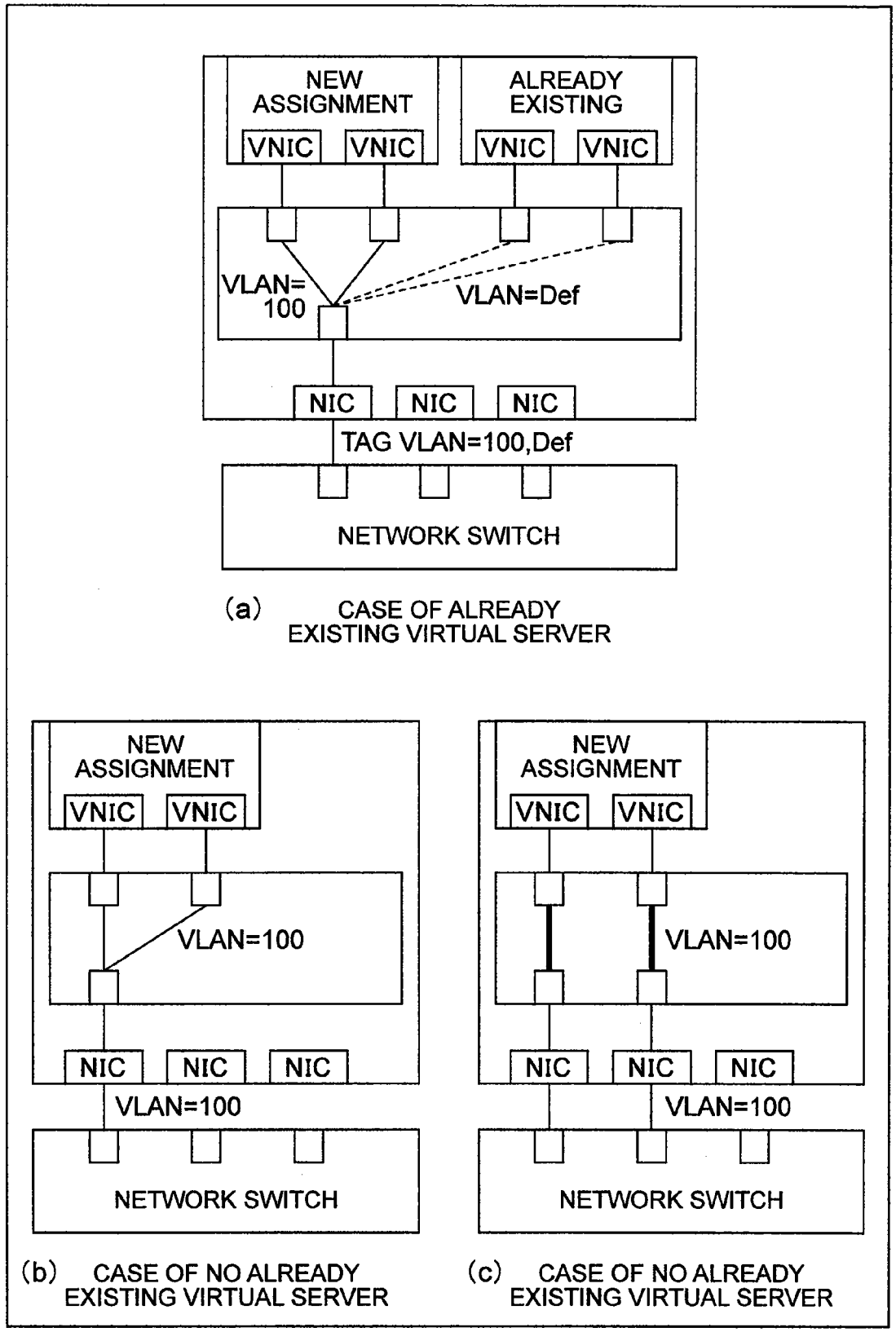
FIG. 16 is a diagram illustrating a network structure after migration.

FIG. 16 is a diagram illustrating the network configuration after migration. As shown in FIG. 16(*a*), if a virtual server exists already on a physical server when the migration destination virtual server is to be configured, there is a possibility that a newly assigned virtual server and an already existing virtual server use different VLANs. Therefore, tag VLAN setting is used for a NIC and ports of a link connecting a virtual network switch and a physical network switch. As shown in FIG. 16(*b*), if another virtual server does not exist on a physical server when the migration destination virtual server is to be configured, usual VLAN setting can be used for a NIC and ports of a link connecting a virtual network switch and a physical network switch. As shown in FIG. 16(*c*), if another virtual server does not exist and there are usable physical NICs more than the number of requested physical NICs, it is possible to use an dedicated mode for NIC of the migration destination server and to make invisible the virtual network switch.

If there are two usable physical NICs when NIC is reserved based on the reservation table 1004 shown in FIG. 11 in the reservation process, assignment shown in FIG. 16(*c*) is possible. If the status of each NIC is checked and at least one of NICs has a fault, setting may be changed to use the configuration of a network shown in FIG. 16(*b*) if another virtual server does not exist, whereas if another server exists, the configuration shown in FIG. 16(*a*) is used.

It is possible to present a more flexible configuration by considering the fault status of another virtual server and each resource during the reservation process and making the above-described judgments as in the foregoing.

As described above, according to the second embodiment, similar advantages to those of the first embodiment can be obtained even if the network switching apparatus 120 and virtual network switch 160 are involved between the migration source physical server 101 and migration destination virtual server 103.

Further, the reservation mechanism 1003 reserves resources of the physical server 107, necessary for configuring the migration destination virtual server 103, during the server migration process, in accordance with the designated reservation table 1004. It is therefore possible to execute server migration even in the case in which the migration destination virtual server 103 is not configured before the server migration process. In this manner, since the migration destination server is not required to be configured before server migration, for example, if necessary resources cannot be reserved, resources may be released during server migration, if another virtual server does not exist during server migration, necessary resources may be dedicated, if there is an assignable physical interface, the physical interface may be dedicated, or conversely, if there is no physical interface, a virtual interface may be reserved. In this manner, a virtual server can be configured by changing the structure and settings in accordance with the statuses of resources during server migration, and server migration can be performed in a flexible environment.

Further, in accordance with the inter-switch setting rule 133 recording setting information between the network switching apparatus 120 and virtual network switch 160, setting between the network switches can be made correctly so that it is not necessary to make settings separately for each of the network switches. It is therefore possible to make settings between network switches, which were difficult in a conventional case, and to perform server migration easily even if there are a plurality of network switches between the migration source server and migration destination server.

Next, description will be made on the third embodiment of the present invention with reference to FIGS. 17 to 25. First, the structure of the third embodiment will be described with reference to FIGS. 17 to 20. Similar constituent elements and operation portions to those of the first embodiment are represented by identical reference symbols, and the detailed description thereof is omitted.

In this embodiment, description will be made on a method of using a network virtual address for information acquisition from a migration source server and information setting to a migration destination server. The information to be acquired from the migration source server includes: information on an agent on the migration source server and information on settings of an I/O interface such as a network interface card and a Fibre channel adapter, and the contents of a system partition and a data partition in a built-in disc if the server uses the disc. Information setting to the migration destination server means resetting the acquired setting information to the migration destination server and copying the contents of the built-in disc to the built-in disc of the migration destination server.

Figure 17:
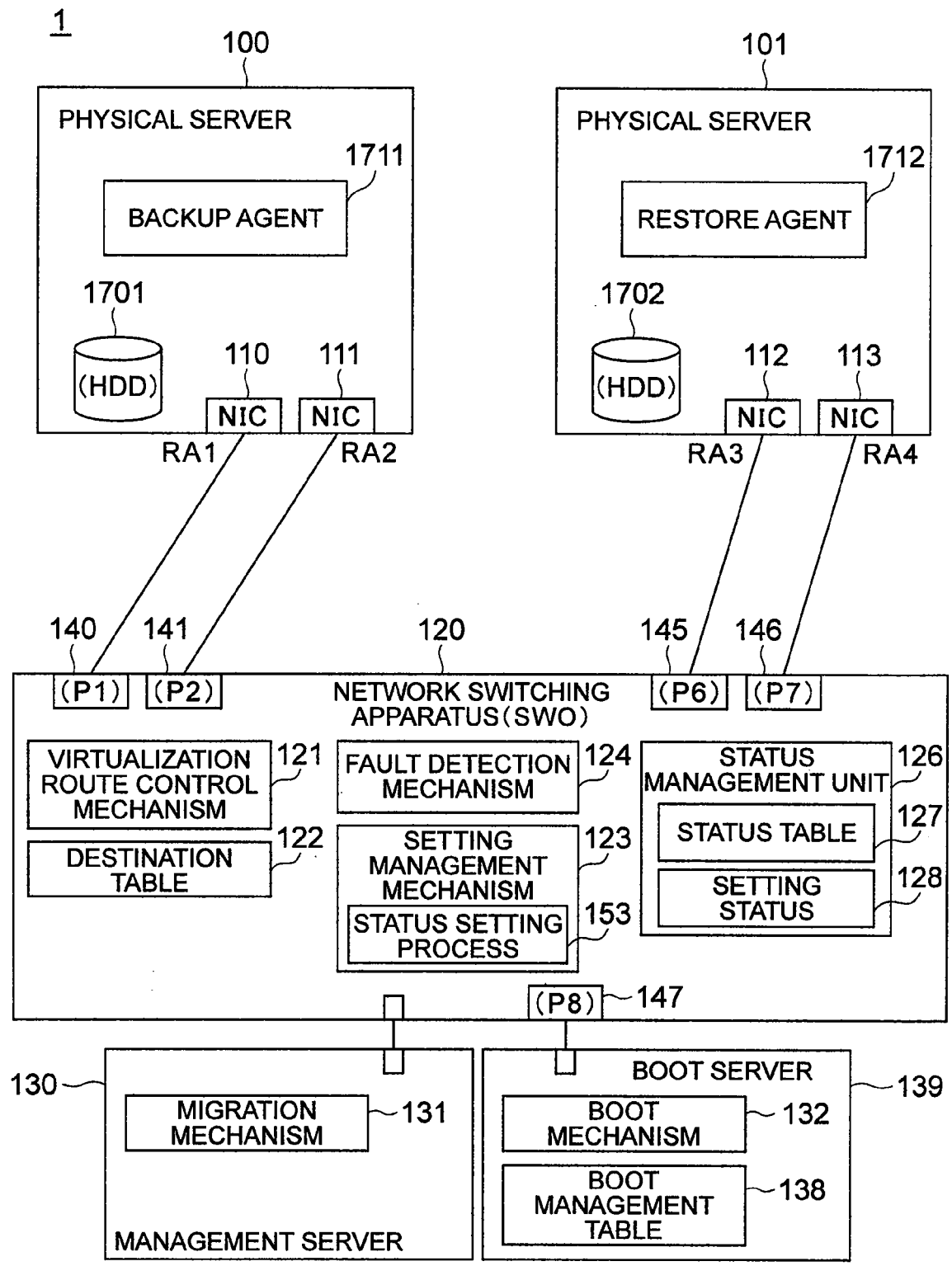
FIG. 17 is a schematic diagram illustrating the structure of a server system regarding server migration according to a third embodiment.

FIG. 17 is a schematic diagram illustrating the outline structure of a server system regarding server migration according to the third embodiment. In this embodiment, as shown in FIG. 17, an execution infrastructure of a physical server 100 is migrated to a physical server 101. The physical server 100 has a built-in disc 1701 which has a system partition to be used for activating an operating system and a data partition for storing data and the like. The physical server 100 may have a plurality of built-in discs, and the system partition and data partition may reside in different built-in discs. A backup agent 1711 is running in the physical server 100 and a restore agent 1712 is running in the physical server 101 during migration in order to migrate information in the built-in disc in responses to an instruction from a migration mechanism 131 of a management server 130. The network switching apparatus 120 has a virtualization route control mechanism 121 and a destination table 122 to be used by the virtualization route control mechanism 121. The virtualization route control mechanism 121 and destination table 122 virtualize a network address. A boot server 139 has a boot mechanism132 and a boot management table 138. A backup process and a restore process are executed by using the boot management table 138, backup agent 1711 and restore agent 1712.

The boot server 139 has a function of backing up or restoring the contents of a built-in disc of a server connected to the business network. The boot server 139 sends an agent for the backup process or restore process to a target server by utilizing a network boot function of the target server. Thereafter, in cooperation with the sent agent, the contents of the built-in disc are read and backed up via the business network, or the backed-up contents are sent to restore them in the built-in disc.

When the target server is to be activated, the network boot function of the target server sends a boot request from a NIC designated in advance to the boot server on the network connected to the NIC. In this case, in order to allow the target server sending the boot request without knowing the IP address of the boot server 139, the boot request is sent to the network as a broadcast packet. Upon reception of the boot request, the boot server 139 sends information necessary for operating in the IP network such as IP address to the target server which sent the request. The target server is assigned the IP address from this information, and can communicate with the boot server 139 by using the IP address. Thereafter, a boot image is received from the boot server 139 by using the UP address, and after completion of reception, the boot image is activated. It is therefore possible to activate services defined by the boot image designated by the boot server 139.

The boot image for the network boot by utilizing the boot server 139 and data associated with backup/restore are transmitted via the business network. Activating a target server by the boot server is also executed via the business network. In contrast, communications for controlling the boot server 139 by the management server is executed via the management network.

The boot server 139 changes a boot status of the boot management table 138 via a management interface of the management network. Upon reception of the boot request from the target server, the boot mechanism 132 executes a process corresponding to the boot status 2002.

FIG. 18 is a diagram illustrating the structure of the destination table shown in FIG. 17. The destination table 122 is constituted of a port number 1801, a valid flag 1802, a virtual address 1803, a physical address 1804, a first rewrite rule 1805, a second rewrite rule 1806, a third rewrite rule 1807 and a fourth rewrite rule 1808. although four rewrite rules are shown in FIG. 18, the number of rules is not limited to four, but five or more rules may also be used. The port number 1801 records a port to which a packet containing a virtualized network address is inputed. Namely, there exists an apparatus having this network address in the network connected to this port. The valid flag 1802 records whether the address virtualization function is valid or invalid. The virtual address 1803 records a virtualized address. The physical address 1804 records a physical address before it is virtualized. The first rewrite rule 1805 to fourth rewrite rule 1808 record adoption conditions. If there are a plurality of rewrite rules applicable to a packet, not all rules are applied, but an applicable rule is applied to a packet sequentially starting from the first rewrite rule 1805. Records having the same port number 1801 may exist if the virtual addresses 1803 are different. However, different virtual addresses 1803 cannot be recorded to a plurality of records having the same physical address 1804.

FIG. 19 is a diagram illustrating the structure of the rewrite rules. Each rewrite rule has a rule number 1901, a rule adoption condition 1902, a flag 1903, a rewrite position 1904 and a value 1905. Each rewrite rule is identified by the rule number 1901. The rule adoption condition 1902 records a packet type. For example, "All" means that the rule is applicable to all packets, and "DHCP" means a packet for network boot defined by Preboot Execution Environment (PXE). The flag 1903 of "input" means that the rule is adopted when a packet arrives at a port. The flag 1903 of "output" means that the rule is adopted when a packet is transmitted from a port. The rule identified by the rule number 1901 of "R1" shown in FIG. 19 indicates that a transmission source address in an "ether" packet is rewritten to a value 1905 of "RA1". The rule identified by the rule number 1901 of "R2" indicates that a client address (a physical address of the server started the boot request) in a DHCP header is rewritten to a value 1905 of "RA1".

FIG. 20 is a diagram illustrating the structure of the boot management table shown in FIG. 17. The boot management table 138 is constituted of a physical address 2001, a boot status 2002, a backup location 2003 and an IP address 2004. The physical address 2001 records a physical address of the NIC of the target server, and a boot server 139 identifies the target server from the physical address 2001. The boot status 2002 indicates an operation when the boot server 139 received a boot request, and the operation can be changed via the management interface. The operation when the boot request is received includes, for example, local activation, backup and restore. The IP address 2004 records an IP address to be supplied to the server which issued the boot request for booting.

The boot management table 138 is recorded in advance by a system administrator via the management network prior to server migration. The system administrator checks the physical addresses of the target migration source server and migration destination server, and determines the backup location and IP address of the servers, and records them in the physical address 2001, backup location 2003 and IP address 2004 of the boot management table 138. "Local activation" is recorded in the boot status 2002.

Next, with reference to FIGS. 21 to 25, description will be made on an operation of a migration process of migrating an execution environment from a physical server to another physical server by using a virtual address.

Figure 21:
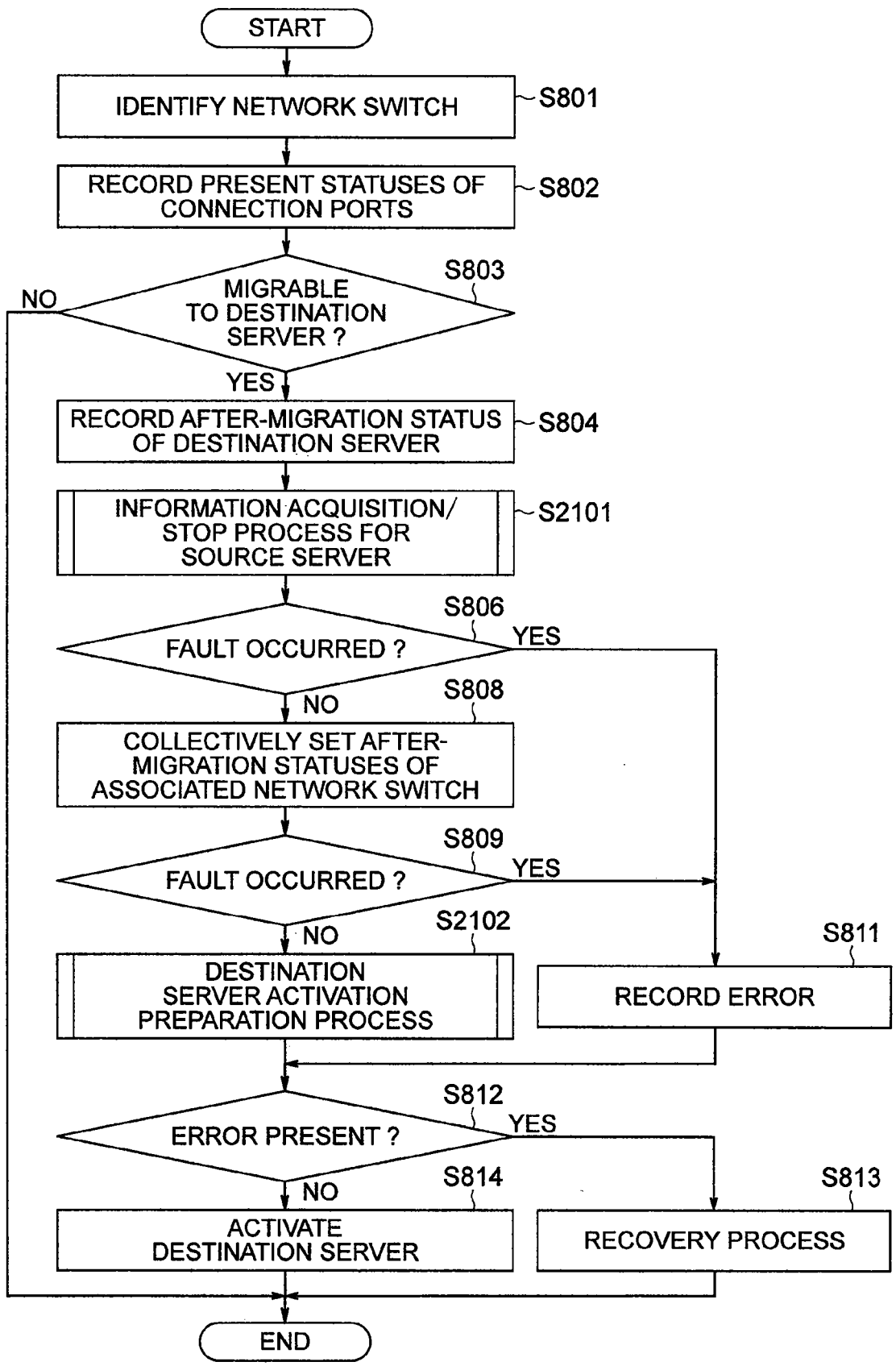
FIG. 21 is a flow chart illustrating a server migration process according to a third embodiment.

FIG. 21 is a flow chart illustrating a migration process according to the third embodiment. The migration mechanism 131 executes a migration destination server information retrieval/stop process S2101 and a migration destination server activation preparation process S2102, instead of the processes at S805 and S810 of the migration process of the first embodiment.

Figure 22:
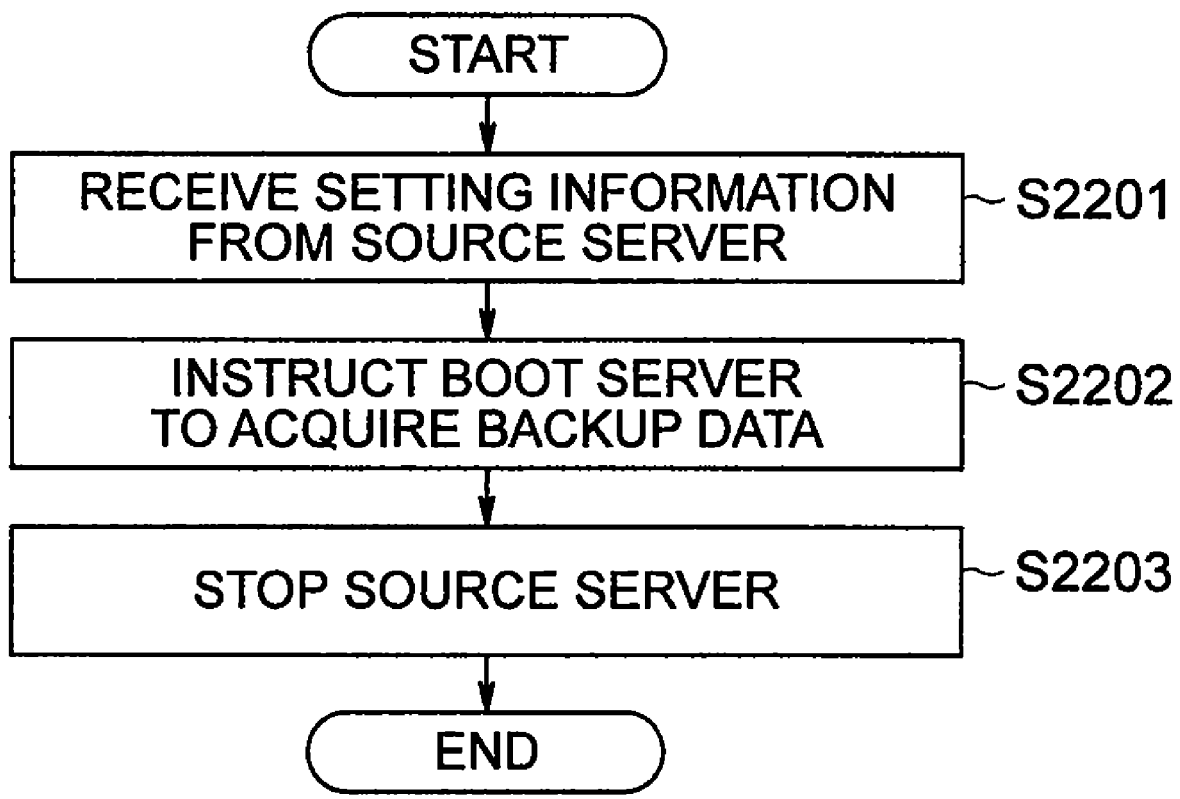
FIG. 22 is a flow chart illustrating a process of migration source server information retrieval and stop shown in FIG. 21.

FIG. 22 is a flow chart illustrating the migration destination server information retrieval/stop process shown in FIG. 21. The migration destination server information retrieval/stop process S2101 is executed by the migration mechanism 131 by controlling the boot server 139 via the management network. It is assumed that the information retrieval agent is running on the migration source server.

First, the migration mechanism 131 receives setting information of an I/O apparatus such as NIC of the migration source physical server 100 from the agent on the migration source physical server 100 via the management network (S2201). Next, the migration mechanism 131 instructs the boot server 139 via the management network to acquire backup of the migration source physical server 100 (S2202). Designation of the migration source physical server 100 is performed by using the physical address (RA1) of NIC 110 of the physical server 100 to be network booted. After the backup completion is confirmed, the migration mechanism 131 stops the migration source physical server 100 (S2203) to terminate the migration destination server information retrieval/stop process.

Figure 23:
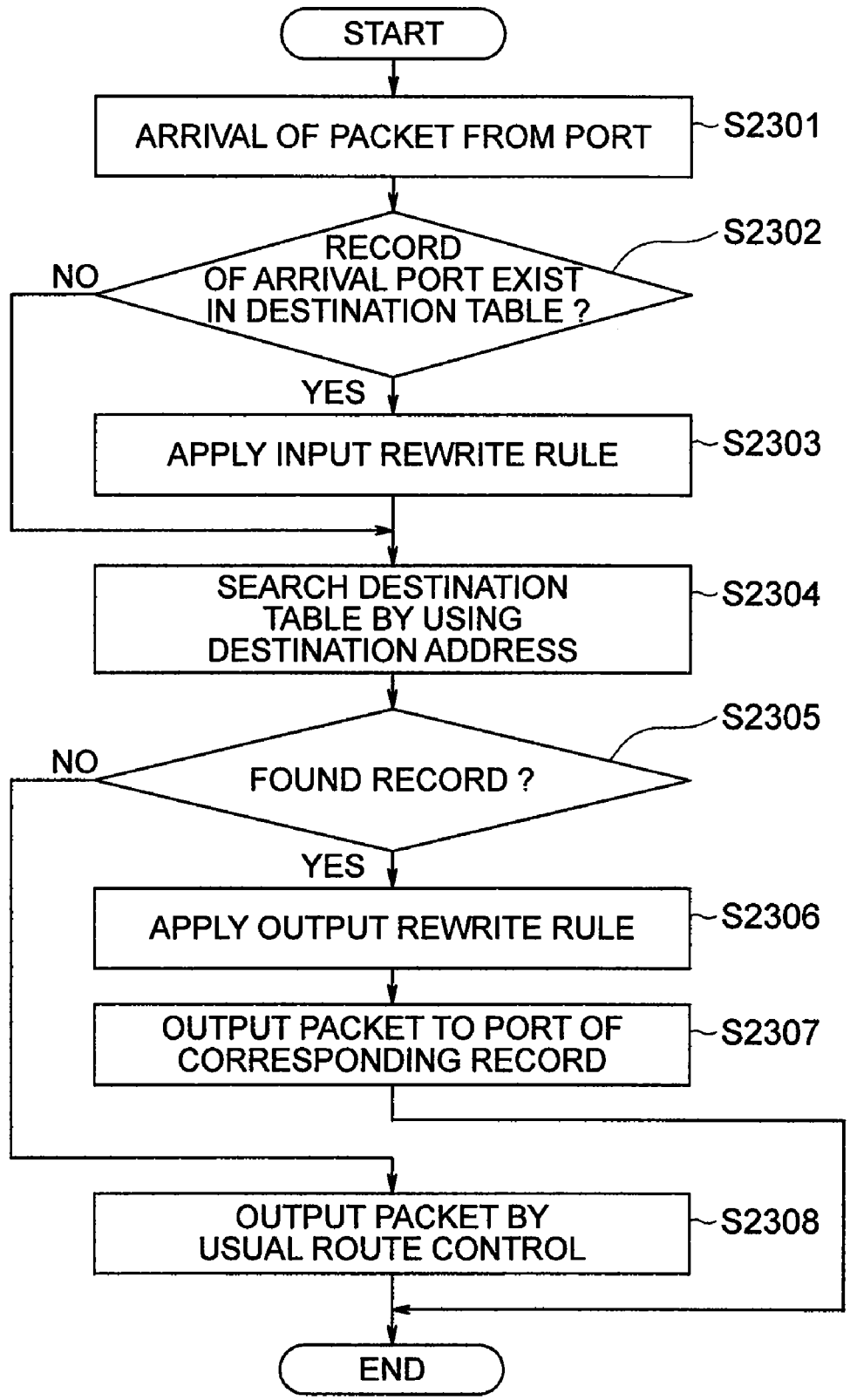
FIG. 23 is a flow chart illustrating the operation of a virtualization route control mechanism shown in FIG. 17.

FIG. 23 is a flow chart illustrating the operation of the virtualization route control mechanism shown in FIG. 17. Upon arrival of a packet from each port (S2301), the virtualization route control mechanism 121 searches the destination table 122 to judge whether there is a record having the port number 1801 of the port at which the packet arrived and the valid flag 1802 of "valid" (S2302). If the search result shows failing to find a record, the process advances to S2304, whereas if a record is found, an input rewrite rule is selected and applied from the first rewrite rule 1805 to fourth rewrite rule 1808 (S2303). Next, a record having the same transmission destination address and virtual address 1803 as those of the arrived packet is searched from the destination table 122 (S2304), to judge whether there is a corresponding record (S2305). If the judgment result indicates that there is no corresponding record, it is assumed that the transmission destination address of the arrived packet is not virtualized, and a usual route control is performed to output the arrived packet (S2308) to thereafter terminate the process. If there is the corresponding record, the port number 1801 of the corresponding record can be obtained as the output destination port number of the arrived packet. If an output rewrite rule exists in the corresponding record, the output rewrite rule of the corresponding record is applied (S2306). Lastly, the packet is output to the port having the port number 1801 of the corresponding record (S2307) to thereafter terminate the process. Since the packet route is controlled in accordance with the virtual address, it is possible to change the destination and source of the packet without changing the physical address.

In the operation of the virtual route control mechanism 121, the destination table 122 is used as if there are two tables. One table is an input table for a packet recording a rewrite rule associated with the packet input port. The other table is a packet output table having an address for searching the port connected to the server indicated by the destination address based on the destination address in the packet, and having a rewrite rule to be applied when a packet is output from the network switching apparatus 120. In this embodiment, although the destination table 122 operates as two tables, the embodiment is not limited thereto, but the table may be divided into separate tables.

Figure 24:
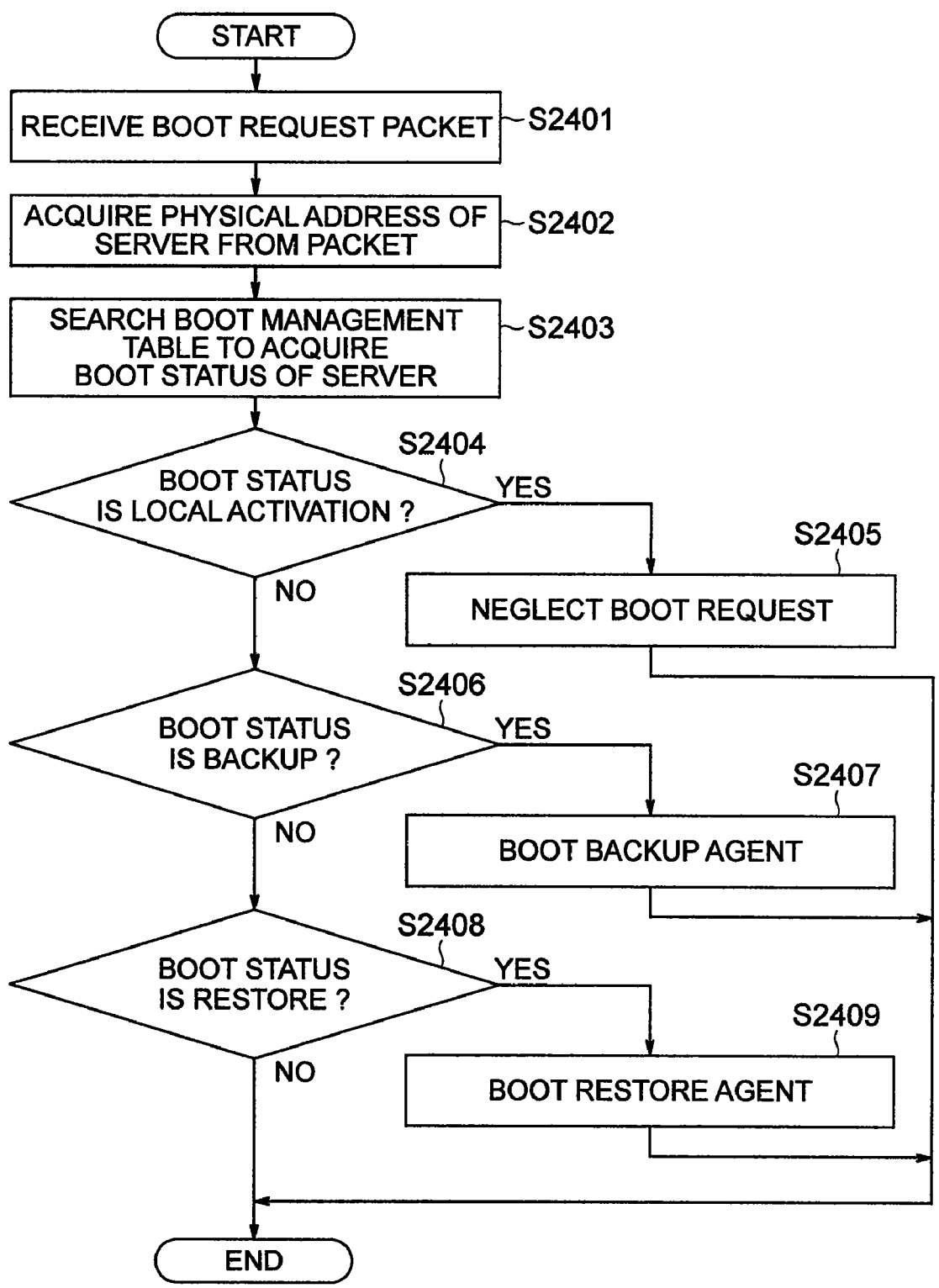
FIG. 24 is a flow chart illustrating the operation of a boot mechanism shown in FIG. 17.

FIG. 24 is a flow chart illustrating the operation of the boot mechanism shown in FIG. 17. Upon reception of a boot request packet via the business network (S2401), the boot mechanism 132 acquires a transmission source physical address from the request packet (S2402), and by using this address as a key, searches the boot management table 138 to acquire the boot status 2002 (S2403). The boot mechanism 132 judges whether the boot status 2002 of the searched record is "local activation" (S2404), and if the boot status 2002 is "local activation", neglects the boot request (S2405). In this case, because a response is not returned, a timeout occurs at the boot request server so that activation (boot) from a local disc is tried. If the boot status 2002 is not "local activation", the boot mechanism 132 judges whether the boot status 2002 of the searched record is "backup status" (S2406), and if the boot status 2002 is "backup status", network-boots the backup agent 1711 via the business network (S2407). The activated backup agent 1711 backups the contents of the built-in hard disc of the activated server to the boot server 130 via the network. If the boot status 2002 is not "backup status", the boot mechanism 132 judges whether the boot status 2002 of the searched record is "restore" (S2408), and if the boot status 2002 is "restore", network-boots the restore agent 1712 via the business network (S2409) to thereafter terminate the process. In this case, the backup data previously backed up is read from the boot server 139, and written in a local disc of the server requesting restore, to thereby perform a restore process. If the boot status 2002 is not "backup, the boot mechanism 132 terminates the process without performing any positive action.

Upon reception of an instruction of backup acquisition from the migration mechanism 131 in the process at S2202 shown in FIG. 22, the boot server 139 sets "backup status" to the boot status 2002 corresponding to the physical address of the migration source physical server 100, in the boot management table 138 shown in FIG. 20. Next, reboot is instructed to the migration source physical server 100 via the management network, and the process is suspended until a boot request is sent from the migration source physical server 100.

The boot request from the migration source physical server 100 is processed by the boot mechanism, and the backup agent 1711 is activated in the migration source physical server 100 in accordance with the procedure shown in FIG. 24. The backup agent 1711 transfers the contents of a designated built-in disc 1701 to the boot server 139 via the business network. Upon reception of the transferred data, the boot server 139 stores the data in the preset backup location 2003. After completion of backup of the contents of all designated local discs, the boot server 139 sends a completion notice of the backup process to the migration mechanism 131 of the management server 130 via the management network.

Figure 25:
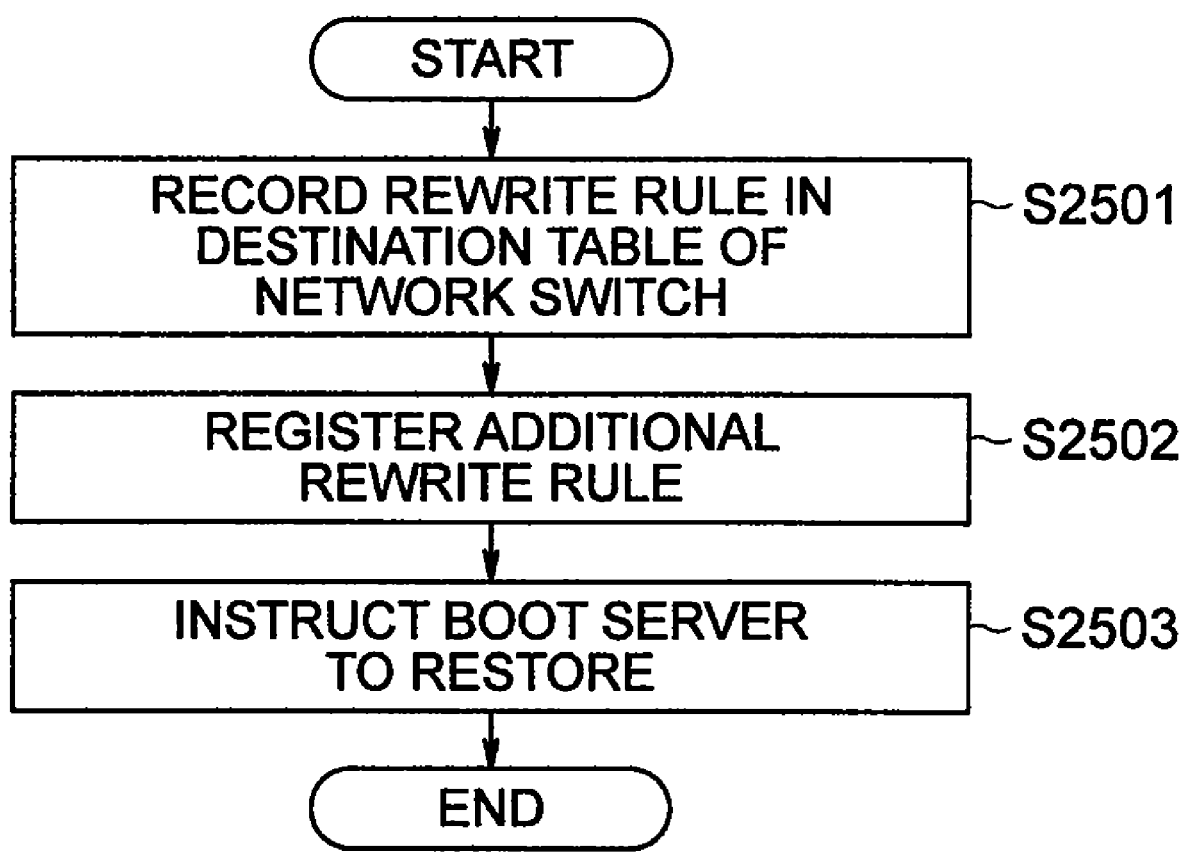
FIG. 25 is a flow chart illustrating a migration destination server activation preparation process shown in FIG. 21.

FIG. 25 is a flow chart illustrating the migration destination server activation preparation process shown in FIG. 21. The migration destination server activation preparation process requires that the boot server 139 recognizes the boot request from the migration destination physical server 101 as if it were sent from the migration source physical server 100. To this end, the migration mechanism 131 records a rewrite rule in the destination table 122 of the network switching apparatus 120 via the management network to rewrite the physical addresses RA1 and RA2 of NICs 110 and 111 of the migration source physical server 100 to the physical addressed RA3 and RA4 of NICs 112 and 113 of the migration destination physical server 101 (S2501). The results are as shown in FIG. 18. The virtualization mechanisms of the ports 140 and 141 (P1 and P2) of the network switching apparatus 120 connected to the migration source physical server 100 are invalidated. The virtualization mechanisms of the ports 145 and 146 (P6 and P7) connected to the migration destination physical server 101 are validated, and the physical addresses RA1 and RA2 inherited from the physical server 100 are set to the virtual addresses 1803. The original physical addresses RA3 and RA4 of NICs 112 and 113 connected to the ports 145 and 146 (P6 and P7) are set to the physical addresses 1804.

The record statuses of the first rewrite rule 1805 to fourth rewrite rule 1808 are as follows. In order for the physical server 101 to act as if it is the physical server 100, the rule numbers 1901 of "R1" and "R4" for rewriting the transmission source addresses of packets input from the ports 145 and 146 (P6 and P7) connected to the physical server 101, from the original physical addresses RA3 and RA4 of NICs 112 and 113 to the physical addresses of RA1 and RA2 of NICs 110 and 111, are recorded in the first rewrite rules 1805 of the port numbers 1801 of "P6" and "P7". Further, since the packets designating the physical addresses RA1 and RA2 of NICs 110 and 111 as the destination are guided as outputs to the ports 145 and 146 (P6 and P7), the rule numbers 1901 of "R3" and "R5" for rewriting the transmission destination addresses of packets output from the ports 145 and 146 (P6 and P7) connected to the physical server 101, from the physical addresses RA1 and RA2 of NICs 110 and 111 to the physical addresses of RA3 and RA4 of NICs 112 and 113 connected to the ports 145 and 146 (P6 and P7), are recorded in the second rewrite rules 1806 of the port numbers 1801 of "P6" and "P7".

In order that the boot request from the migration destination server 101 is correctly processed, the migration mechanism 131 records an additional rewrite rule in the destination table 122 via the management network (S2502). The additional rewrite rule is designated in order that the physical address of NIC of the requesting physical server 101 pretending the migration source server 100 is recorded as a client address in the boot request packet to be transmitted by the physical server via the business network. The client address is set in a field of the network packet different from the field in which the transmission source address and transmission destination address exist. In the case of the boot request from the physical server 101, the physical address RA3 of NIC 112 is set in the client address so that it is not possible to pretend that the physical server 100 is activated. Therefore, a rewrite rule for rewriting the client address to the physical address RA1 of NIC 110 of the physical server 100 is added to the third rewrite rule 1807 of "R2" for the port 145 (P6). Conversely, inverse rewrite is performed for a response to the boot request, a rewrite rule "R6" for writing back the client address designated in a packet to a physical address of NIC 112 is added to the fourth rewrite rule 1808, so as to prevent contradiction of the packet received at the physical server 101.

Lastly, after the rewrite rule setting for the network switching apparatus 120 is recorded, the migration mechanism 131 instructs restore to the boot server 139 via the management network (S2503), to thereafter terminate the migration destination server activation preparation process S2102. Similar to backup, a physical server is designated for restore by a physical address (RA1) of NIC 110 of the migration source physical server 100 to be booted.

When restore is instructed via the management network, the boot server 139 records "restore status" to the boot status 2002 corresponding to the migration source physical server 100 (physical address RA1), in the boot management table 138 shown in FIG. 20. Next, by designating the physical address RA1 originally indicating the migration source physical server 100, reboot is instructed via the business network, and the process is suspended until a boot request is received from the business network. The reboot instruction is transmitted via the network switching apparatus 120, and transferred to the migration destination physical server 101 by using the rewrite function of the network switching apparatus 120. Upon reception of the reboot instruction, the migration destination physical server 101 is reboot. The rebooted migration destination physical server 101 sends a boot request to the boot server 139 via the business network. The boot request is processed by the boot mechanism 132 of the boot server 139, and in accordance with the procedure shown in FIG. 23, the restore agent 1712 is activated on the physical server 101 indicated by the physical address RA1. Although RA1 indicates originally the physical server 100, it indicates the physical server 101 because of the virtualization route control mechanism 121. Although the boot server 139 considers that the restore agent 1712 is activated in the migration source physical server 100, because of the settings by the rewrite mechanism of the network switching apparatus 120, the restore agent is actually activated on the migration destination physical server as shown in FIG. 17. The restore agent 1712 writes the backup contents into a designated local disc 1702. After all write operations are completed, a process completion is notified to the boot server 139 via the business network. Upon reception of this notice, the boot server 139 notifies the restore process completion notice to the migration mechanism 131 of the management server 130.

Applying rewrite rules will be described specifically relative to a communication process of a boot request from the migration destination physical server 101 with the boot server via the network switching apparatus 120. The contents in the destination table 122 shown in FIG. 18 are set in the network switching apparatus 120. The activated migration destination physical server 101 transmits a boot request (a DHCP packet with a PXE option) from NIC 112. In this case, the physical address RA3 of NIC 112 is set to a packet transmission source address. RA3 is also set to a hardware address field (client address), which contains a hardware address of a boot request server, in the header defined by a protocol realizing a network boot. When the boot request arrives at the port 145 (P6) of the network switching apparatus 120, the virtualization route control mechanism 121 checks the rewrite rules set to the port 145 (P6) to select an input rewrite rule suitable for adoption conditions. The candidate rewrite rules are the rule numbers 1901 of "R1" and "R2" shown in FIG. 19, and since the rule adoption condition 1902 for "R1" is "All", this rule is an adoption candidate. Although the rule adoption condition 1902 of "R2" is a "DHCP" packet, "R2" is also an adoption candidate because the boot request is a DHCP packet. As a result, the rewrite rules R1 and R2 are adopted. Applying the rewrite rule R1 rewrites the packet transmission source address from RA3 to RA1, and applying the rule R2 rewrites also the client address from RA3 to RA1. Thereafter, the boot request is sent from the port 147 (P8) to the boot server 139.

A return packet from the boot server 139 is received at the port 147 (P8) of the network switching apparatus 120. The return packet has RA1 (migration source physical server 100) in the transmission source address. Since the record having the port number 1801 of "P8" does not exist in the destination table 122, the destination table 122 is searched by using the transmission destination address (S2304). The virtual address 1803 of the destination table 122 is searched to select a valid record having the port number 1801 of "P6". Next, the first rewrite rule 1805 to fourth rewrite rule 1808 are checked to adopt the output rewrite rules R3 and R6 in the second rewrite rule 1806 and fourth rewrite rule 1808. In this manner, the packet transmission destination address is rewritten into RA3 and the client address is also rewritten into RA3 so that the packet is transmitted from the port 146 (P6) to the migration destination physical server 101.

In this embodiment, if the migration destination server is a virtual server, the virtual network switch 160 shown in FIG. 10 is provided with the virtualization route control mechanism 121 and destination table 122 to allow similar server migration to be performed.

As described above, according to the embodiment, even if server migration is performed by using a virtual address, similar advantages to those of the first embodiment can be obtained. Further, since a packet route is controlled in accordance with a virtual address, it is possible to change the transmission destination and source of a packet without changing a physical address. Accordingly, it is possible, for example, to output a packet input to the network switching apparatus 120 to the port 1801 indicated by the virtual address 1803 by applying the rewrite rule in accordance with the destination table 122, to perform server migration without inheriting the migration source server physical address to the migration destination server, and to readily solve a problem of duplication of physical addresses. Further, by rewriting the transmission source and destination addresses of a packet input to and output from the network switching apparatus 120, the migration destination server can be used from external clients via the network switching apparatus without aware of server migration.

The structure of the present invention is not limited only to the above-described embodiment, but various modifications are possible without departing the gist of the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network switching apparatus for connecting a first server and a second server, comprising:
   a plurality of ports connectable to either the first server or the second server;
   a collective setting changing unit for changing settings of the plurality of ports in accordance with setting information designated to the plurality of ports, using a server migration process to perform migration of the first server to the second server via a migration destination virtual server;
   a virtualization route control mechanism unit for controlling a route of an input packet in accordance with a virtual address, wherein the virtual address is for virtualizing network addresses of the first server and the second server; and
   a destination table having:
      a port number of each of the ports,
      the virtual address,
      a physical address which is not virtualized,
      a first output rewrite rule corresponding to a first rewrite condition for a transmission destination address contained in the packet,
      a second output rewrite corresponding to a second rewrite condition for a transmission source address contained in the packet,
   wherein the virtualization route control mechanism unit rewrites the transmission destination address contained in the packet in accordance with the destination table, and
   wherein the virtualization route control mechanism unit rewrites the transmission source address contained in the packet in accordance with the destination table,
   wherein the virtualization route control mechanism unit searches the destination table for a virtual address corresponding to a destination address of a packet that arrived at the network switching apparatus, and outputs, when there is a virtual address corresponding to the destination address of the packet, the packet to a port having a port number of the virtual address.

2. A server system comprising:
   a first server and a second server each having a server virtualization mechanism unit for configuring a plurality of virtual servers;
   a network switching apparatus having a plurality of ports connectable to either the first server or the second server, for establishing a connection between the first server and the second server; and
   a management server for managing a server migration process for performing migration of the first server to the second server via a migration destination virtual server, wherein the management server is connected to the network switching apparatus,
   wherein:
   the management server includes a migration mechanism unit for transmitting setting information to be designated to the plurality of ports during the server migration process, and
   the network switching apparatus includes a collective setting changing unit for changing settings of the plurality of ports in accordance with the transmitted setting information on the plurality of ports,
   wherein:
   the server virtualization mechanism unit of the second server has a virtual network switch for establishing a connection between the plurality of virtual servers,
   the virtual network switch has a plurality of virtual ports connectable to either the second server or the migration destination virtual server,
   the migration mechanism unit transmits setting information to be designated to the plurality of virtual ports during the server migration process, and
   the virtual network switch changes settings of the plurality of ports in accordance with the transmitted setting information on the plurality of virtual ports,
   wherein:
   the management server has a reservation table for storing requirements of resources necessary for configuring the migration destination virtual server, the migration mechanism unit designates the reservation table and instructs the server virtualization mechanism unit of the second server to configure the migration destination virtual server, the server virtualization mechanism unit of the second server has a reservation mechanism unit for reserving resources of the second server necessary for configuring the migration destination virtual server during the server migration process, in accordance with the designated reservation table, and the reservation mechanism unit has a reservation cancel unit for releasing reserved resources if there is a resource unable to be reserved in the resources necessary for configuring the migration destination virtual server.

3. A server system comprising:

a first server and a second server each having a server virtualization mechanism unit for configuring a plurality of virtual servers;

a network switching apparatus having a plurality of ports connectable to either the first server or the second server, for establishing a connection between the first server and the second server; and a management server for managing a server migration process for performing migration of the first server to the second server via a migration destination virtual server, wherein the management server is connected to the network switching apparatus, wherein:

the management server includes a migration mechanism unit for transmitting setting information to be designated to the plurality of ports during the server migration process, and the network switching apparatus includes a collective setting changing unit for changing settings of the plurality of ports in accordance with the transmitted setting information on the plurality of ports, wherein:

the server virtualization mechanism unit of the second server has a virtual network switch for establishing a connection between the plurality of virtual servers, the virtual network switch has a plurality of virtual ports connectable to either the second server or the migration destination virtual server, the migration mechanism unit transmits setting information to be designated to the plurality of virtual ports during the server migration process, and the virtual network switch changes settings of the plurality of ports in accordance with the transmitted setting information on the plurality of virtual ports, wherein:

the management server has a reservation table for storing requirements of resources necessary for configuring the migration destination virtual server, the migration mechanism unit designates the reservation table and instructs the server virtualization mechanism unit of the second server to configure the migration destination virtual server, the server virtualization mechanism unit of the second server has a reservation mechanism unit for reserving resources of the second server necessary for configuring the migration destination virtual server during the server migration process, in accordance with the designated reservation table, the migration mechanism unit communicates with the server virtualization mechanism unit and judges whether a virtual server other than the migration destination virtual server has already been configured on the second server, and the reservation mechanism unit occupies and reserves the resources possessed by the second server necessary for configuring the migration destination virtual server during the server migration process, if a virtual server other than the migration destination virtual server has not been configured.

4. A server system comprising:

a first server and a second server each having a server virtualization mechanism unit for configuring a plurality of virtual servers;

a network switching apparatus having a plurality of ports connectable to either the first server or the second server, for establishing a connection between the first server and the second server; and a management server for managing a server migration process for performing migration of the first server to the second server via a migration destination virtual server, wherein the management server is connected to the network switching apparatus, wherein:

the management server includes a migration mechanism unit for transmitting setting information to be designated to the plurality of ports during the server migration process, and the network switching apparatus includes a collective setting changing unit for changing settings of the plurality of ports in accordance with the transmitted setting information on the plurality of ports, wherein:

the server virtualization mechanism unit of the second server has a virtual network switch for establishing a connection between the plurality of virtual servers, the virtual network switch has a plurality of virtual ports connectable to either the second server or the migration destination virtual server, the migration mechanism unit transmits setting information to be designated to the plurality of virtual ports during the server migration process, and the virtual network switch changes settings of the plurality of ports in accordance with the transmitted setting information on the plurality of virtual ports, wherein:

the management server has a reservation table for storing requirements of resources necessary for configuring the migration destination virtual server, the migration mechanism unit designates the reservation table and instructs the server virtualization mechanism unit of the second server to configure the migration destination virtual server, the server virtualization mechanism unit of the second server has a reservation mechanism unit for reserving resources of the second server necessary for configuring the migration destination virtual server during the server migration process, in accordance with the designated reservation table, the server virtualization mechanism unit of the second server has an access function for directly accessing a physical network interface via a virtual network interface possessed by the migration destination virtual server, and the reservation mechanism unit judges whether there is a resource of the physical network interface assignable to the migration destination virtual server, and if there is the resource of the assignable physical network interface, occupies and reserves the assignable physical network interface by using the access function.

5. The server system according to claim 4, wherein if the resource of the assignable physical network interface does not exist, the virtual network interface is reserved.

6. A server system comprising:
a first server and a second server each having a server virtualization mechanism unit for configuring a plurality of virtual servers;
a network switching apparatus having a plurality of ports connectable to either the first server or the second server, for establishing a connection between the first server and the second server; and
a management server for managing a server migration process for performing migration of the first server to the second server via migration destination virtual server, wherein the management server is connected to the network switching apparatus,
wherein:
the management server includes a migration mechanism unit for transmitting setting information to be designated to the plurality of ports during the server migration process, and
the network switching apparatus includes a collective setting changing unit for changing settings of the plurality of ports in accordance with the transmitted setting information on the plurality of ports,
wherein:
the server virtualization mechanism unit of the second server has a virtual network switch for establishing a connection between the plurality of virtual servers,
the virtual network switch has a plurality of virtual ports connectable to either the second server or the migration destination virtual server,
the migration mechanism unit transmits setting information to be designated to the plurality of virtual ports during the server migration process, and
the virtual network switch changes settings of the plurality of ports in accordance with the transmitted setting information on the plurality of virtual ports,
wherein:
the migration mechanism unit has an inter-switch setting rule having setting information regarding inter-switch settings between the network switching apparatus and the virtual network switch, and in accordance with the inter-switch setting rule, determines setting information to be designated to the port connecting the second server and setting information to be designated to the virtual port connecting the migration destination virtual server during the server migration process,
the server virtualization mechanism of the first server has a second virtual network switch for establishing a connection among the plurality of virtual servers;
the second virtual network switch has a plurality of second virtual ports connectable to either the first server or the virtual server,
the inter-switch setting rule has inter-switch setting information between the network switching apparatus and the second virtual network switch, and
the migration mechanism unit determines, in accordance with the inter-switch setting rule, setting information to be designated to the port connecting the first server and setting information to be designated to the second virtual port connecting the second virtual server during the server migration process.

7. A server migration method for a server system comprising a first server and a second server each having a server virtualization mechanism unit for configuring a plurality of virtual servers, a network switching apparatus having a plurality of ports connectable to either the first server or the second server for establishing a connection between the first server and the second server, and a management server for managing migration of the first server to the second server via a migration destination virtual server, wherein management server is connected to the network switching apparatus, the server migration method comprising steps of:
transmitting a first set of setting information from the management server to the migration destination virtual server, wherein the first set of setting information comprises designations of the plurality of ports; and
changing settings of the plurality of ports in accordance with the transmitted first set of setting information on the plurality of ports,
wherein:
the server virtualization mechanism unit of the second server has a virtual network switch for establishing a connection between the plurality of virtual servers,
the virtual network switch has a plurality of virtual ports connectable to either the second server or the migration destination virtual server, and
the server migration method further comprises steps of:
transmitting a second set of setting information to the migration destination virtual server, wherein the second set of setting information comprises designations of the plurality of virtual ports; and
changing settings of the plurality of ports in accordance with the transmitted second set of setting information on the plurality of virtual ports,
wherein:
the management server has a reservation table for storing requirements of resources necessary for configuring the migration destination virtual server, and
the server migration method further comprises steps of:
designating the reservation table and instructing the server virtualization mechanism unit of the second server to configure the migration destination virtual server;
reserving resources of the second server necessary for configuring the migration destination virtual server in accordance with the designated reservation table; and
releasing reserved resources if there is a resource unable to be reserved in the resources necessary for configuring the migration destination virtual server.

8. A server migration method for a server system comprising a first server and a second server each having a server virtualization mechanism unit for configuring a plurality of virtual servers, a network switching apparatus having a plurality of ports connectable to either the first server or the second server for establishing a connection between the first server and the second server, and a management server for managing migration of the first server to the second server via a migration destination virtual server, wherein the management server is connected to the network switching apparatus, the server migration method comprising steps of:
transmitting a first set of setting information from the management server to the migration destination virtual server, wherein the first set of setting information comprises designations of the plurality of ports; and
changing settings of the plurality of ports in accordance with the transmitted first set of information on the plurality of ports, wherein:

the server virtualization mechanism unit of the second server has a virtual network switch for establishing a connection between the plurality of virtual servers, the virtual network switch has a plurality of virtual ports connectable to either the second server or the migration destination virtual server, and the server migration method further comprises steps of:

transmitting a second set of setting information to the migration destination virtual server, wherein the second set of setting information comprises designations of the plurality of virtual ports; and changing settings of the plurality of ports in accordance with the transmitted second set of setting information on the plurality of virtual ports, wherein:

the management server has a reservation table for storing requirements of resources necessary for configuring the migration destination virtual server, and the server migration method further comprises steps of:

designating the reservation table and instructs the server virtualization mechanism unit of the second server to configure the migration destination virtual server;

reserving resources of the second server necessary for configuring the migration destination virtual server in accordance with the designated reservation table;

communicating with the server virtualization mechanism unit and judging whether a virtual server other than the migration destination virtual server has already been configured on the second server; and occupying and reserving the resources possessed by the second server necessary for configuring the migration destination virtual server, if a virtual server other than the migration destination virtual server has not been configured.

9. A server migration method for a server system comprising a first server and a second server each having a server virtualization mechanism unit for configuring a plurality of virtual servers, a network switching apparatus having a plurality of ports connectable to either the first server or the second server for establishing a connection between the first server and the second server, and a management server for managing migration of the first server to the second server via a migration destination virtual server, wherein the management server is connected to the network switching apparatus, the server migration method comprising steps of:

transmitting a first set of setting information from the management server to the migration destination virtual server, wherein the first set of setting information comprises designations of the plurality of ports; and changing settings of the plurality of ports in accordance with the transmitted first set of setting information on the plurality of ports, wherein:

the server virtualization mechanism unit of the second server has a virtual network switch for establishing a connection between the plurality of virtual servers, the virtual network switch has a plurality of virtual ports connectable to either the second server or the migration destination virtual server, and the server migration method further comprises steps of:

transmitting a second set of setting information to the migration destination virtual server, wherein the second set of setting information comprises designations of the plurality of virtual ports; and changing settings of the plurality of ports in accordance with the transmitted second set of setting information on the plurality of virtual ports, wherein:

the management server has a reservation table for storing requirements of resources necessary for configuring the migration destination virtual server, and the server migration method further comprises steps of:

designating the reservation table and instructing the server virtualization mechanism unit of the second server to configure the migration destination virtual server; and reserving resources of the second server necessary for configuring the migration destination virtual server, in accordance with the designated reservation table, wherein:

the server virtualization mechanism unit of the second server has an access function for directly accessing a physical network interface via a virtual network interface possessed by the migration destination virtual server, and the server migration method further comprises a step of judging whether there is a resource of the physical network interface assignable to the migration destination virtual server, and if there is the resource of the assignable physical network interface, occupying and reserving the assignable physical network interface by using the access function.

10. The server migration method for a server system according to claim 9, further comprising a step of reserving the virtual network interface if the resource of the assignable physical network interface does not exist.

11. A server migration method for a server system comprising a first server and a second server each having a server virtualization mechanism unit for configuring a plurality of virtual servers, a network switching apparatus having a plurality of ports connectable to either the first server or the second server for establishing a connection between the first server and the second server, and a management server for managing migration of the first server to the second server via a migration destination virtual server, wherein the management server is connected to the network switching apparatus, the server migration method comprising steps of:

transmitting a first set of setting information from the management server to the migration destination virtual server, wherein the first set of setting information comprises designations of the plurality of ports; and changing settings of the plurality of ports in accordance with the transmitted first set of setting information on the plurality of ports, wherein:

the server virtualization mechanism unit of the second server has a virtual network switch for establishing a connection between the plurality of virtual servers, the virtual network switch has a plurality of virtual ports connectable to either the second server or the migration destination virtual server, and the server migration method further comprises steps of:

transmitting a second set of setting information to the migration destination virtual server, wherein the second set of setting information comprises designations of the plurality of virtual ports; and changing settings of the plurality of ports in accordance with the transmitted second set of setting information on the plurality of virtual ports, wherein:

the management server has a reservation table for storing requirements of resources necessary for configuring the migration destination virtual server, the migration mechanism unit has an inter-switch setting rule having a third set of setting information regarding inter-switch settings between the network switching apparatus and the virtual network switch, and the server migration method further comprises a step of in accordance with the inter-switch setting rule, using the third set of setting information to designate to the port connecting the second server and determining a fourth set of setting information to be designated to the virtual port connecting the migration destination virtual server, wherein:

the server virtualization mechanism of the first server has a second virtual network switch for establishing a connection among the plurality of virtual servers, the second virtual network switch has a plurality of second virtual ports connectable to either the first server or the virtual server, the inter-switch setting rule has inter-switch setting information between the network switching apparatus and the second virtual network switch, and the server migration method further comprises a step of determining, in accordance with the inter-switch setting rule, the third set of setting information to be designated to the port connecting the first server and the fourth set of setting information to be designated to the second virtual port connecting the second virtual server.

* * * * *